United States Patent
Ishiwata et al.

(10) Patent No.: US 6,741,356 B1
(45) Date of Patent: May 25, 2004

(54) METHOD FOR DETECTING PHYSICAL AMOUNT OF OBJECT AND OPTICAL APPARATUS USING THE SAME

(75) Inventors: Hiroshi Ishiwata, Hachioji (JP); Toyohiko Yatagai, Nagareyama (JP); Masahide Itoh, Tsukuba (JP)

(73) Assignee: Olympus Corporation, Tokyo (JP)

( * ) Notice: Subject to any disclaimer, the term of this patent is extended or adjusted under 35 U.S.C. 154(b) by 322 days.

(21) Appl. No.: 09/664,723

(22) Filed: Sep. 19, 2000

(30) Foreign Application Priority Data

Sep. 20, 1999 (JP) .......................... 11-304467

(51) Int. Cl.⁷ .............................. G01B 9/02
(52) U.S. Cl. ...................... 356/491; 356/495
(58) Field of Search ................... 356/491, 495, 356/511, 512, 516; 359/370, 371; 250/559.22

(56) References Cited

U.S. PATENT DOCUMENTS

| | | | | |
|---|---|---|---|---|
| 5,420,717 A | * | 5/1995 | Tabata | 359/371 |
| 5,604,591 A | * | 2/1997 | Kitagawa | 356/491 |
| 5,751,475 A | | 5/1998 | Ishiwata et al. | |
| 5,969,855 A | | 10/1999 | Ishiwata et al. | |
| 6,369,375 B1 | * | 4/2002 | Ishiwata | 250/208.1 |

FOREIGN PATENT DOCUMENTS

| | | |
|---|---|---|
| JP | 5-149719 | 6/1993 |
| JP | 5-256795 | 10/1993 |
| JP | 7-239212 | 9/1995 |
| JP | 7-248261 | 9/1995 |
| JP | 9-15504 | 1/1997 |

OTHER PUBLICATIONS

Dubois et al, "Real–Time Reflectivity and Topography Imagery of Depth–Resolved Microscopic Surfaces", Optics Letters, vol. 24, No. 5, Mar. 1999, pp. 309–311.

* cited by examiner

Primary Examiner—Samuel A. Turner
(74) Attorney, Agent, or Firm—Pillsbury Winthrop LLP

(57) ABSTRACT

A detection apparatus includes a differential interference contrast microscope, a device for changing the amount of retardation between the two polarized components, a device for photographing the image of an object to be observed, and a device for performing a calculation with respect to the image captured by this photographing device. In the detection apparatus, amounts of retardation between two polarized components split in an illumination optical system of the differential interference contrast microscope are detected to form two differential interference contrast images relative to the object in which the amounts of retardation between the polarized components are equal, but have different signs. Subsequently, in the two differential interference contrast images, a differential calculation and a summed calculation are performed with regard to respective corresponding pixels to obtain a differential image and a summed image. The ratio of image information between the differential image and the summed image is calculated, and from the result of this calculation, image information in a predetermined range is extracted. In this way, the phase of the object can be detected.

24 Claims, 10 Drawing Sheets

METHOD FOR DETECTING PHYSICAL AMOUNT OF OBJECT AND OPTICAL APPARATUS USING THE SAME

BACKGROUND OF THE INVENTION

1. Field of the Invention

This invention relates to a method for detecting a step and a phase change of an object to be observed from the image information of the object obtained by an interference microscope such as a differential interference contrast microscope (DIC microscope), and an optical apparatus using the method.

2. Description of Related Art

A microscope utilizing interference, such as a DIC microscope, has been widely used to observe the microscopic structure of a human body or an IC pattern because information on a phase change and a step of an object can be visualized by interference. In particular, various attempts have recently been made to use the DIC microscope for the inspection of minute projections (bumps) for intimate contact prevention of a magnetic head, provided on the surface of a magnetic disk, the measurements of a defect in a phase-shift reticle used for pattern exposure of a semiconductor and the amount of phase difference, and the positioning device of a semiconductor wafer.

For example, each of Japanese Patent Preliminary Publication Nos. Hei 5-149719 and Hei 7-248261 discloses a technique of applying a DIC microscope, which is thought of as a shearing interferometer or a Mach-Zehnder interferometer, to the detection of a defect in a phase-shift reticle and the measurement of phase. Japanese Patent Preliminary Publication No. Hei 7-239212 discloses a technique that the DIC microscope is used to detect the edge of a positioning mark provided on a semiconductor wafer, thereby positioning the semiconductor wafer.

In each of these techniques, however, conventional interference measuring technology is merely applied to the DIC microscope, and the influence of diffraction of light on the surface of an object is not taken into account. Moreover, the influence of a change in intensity of light caused by a change in reflectance or transmittance of light on the object is also not taken into account.

For these influences of the diffraction and intensity change of light on the object, in Japanese Patent Preliminary Publication No. Hei 9-15504, the present inventor clarifies the imaging characteristics of the DIC microscope and provides an approach that extracts the phase information of the object from an image obtained by the DIC microscope.

The DIC microscope is such that a phase change on the surface of the object is converted into an image intensity distribution. Conversely, it is conceivable that the intensity distribution of a differential interference contrast image is analyzed and thereby the phase change on the surface of the object can be detected. Further, it is set forth in Hei 7-239212 that since the edge of the step of the object brings about an abrupt phase change and as a result, the image intensity distribution is also abruptly changed, a portion of the image intensity distribution abruptly changed is extracted from the differential interference contrast image, and thereby the position of the step of the object can be detected.

Japanese Patent Preliminary Publication No. Hei 5-256795 discloses a technique that uses the differential interference contrast image of a normal sample as a reference image and compares this reference image with the image of the object, thereby detecting foreign matter contained in the object.

A Michelson type or Mirau type interference microscope is also used to measure the phase distribution of the object.

In the case where the phase distribution of the object is derived from the intensity distribution of the differential interference contrast image, the phase change of the object cannot be detected with accuracy if the object contains factors other than the phase change of the object caused by a change in transmittance or reflectance of light or a change in intensity of illumination light in the object.

For the measurement of a change in the amount of phase due to the step of the object, when the height of the step is relatively small, a fringe scanning technique employed for interference measurement is combined with the operation of the DIC microscope and thereby the phase information of the object can be extracted. In the fringe scanning technique, four images in which the amounts of retardation between polarized components are different must be formed for calculation, and thus the problem of reducing a processing time cannot be solved.

When the amounts of retardation between polarized components are 0 and $\pi$, image intensity distributions differ materially. Thus, in order to detect a correct amount of phase, an image sensor whose dynamic range is wide becomes necessary, which makes an optical apparatus complicated.

When the height of the step of the object increases, the problem arises that the amount of phase measured by the combination with the fringe scanning technique becomes smaller than in an actual step.

Even when the Michelson type or Mirau type interference microscope is used to measure the phase distribution of the object, there is the problem that the object, which has the step, is affected by diffraction and scattering of light at the step and a correct amount of phase cannot be measured.

SUMMARY OF THE INVENTION

It is, therefore, an object of the present invention to provide a method for detecting the height of a step and the amount of phase change of an object in a shorter time than in a conventional way and making a precise measurement when the height of the step increases, by separating phase information and intensity information from an interference image of the object obtained by an interference microscope, and a detection apparatus (optical apparatus) using this method.

In order to achieve the above object, the detection apparatus according to the present invention includes a microscope optical system having a light source, an illumination optical system for leading light emitted from the light source to an object, an imaging optical system for forming the image of the object, and at least one polarizing member for separating the light from the light source into two polarized components; an adjusting member for changing the amount of retardation between the two polarized components; and an image pickup member for photographing a differential interference contrast image of the object. The detection apparatus, operated through a process for photographing two differential interference contrast images relative to the object in which the amounts of retardation are equal, but have different signs, is provided with a processing unit operated through a calculation process for performing a differential calculation and a s ed calculation relative to respective pixels corresponding to the two differential interference contrast images to obtain differential image information and summed image information and another calculation process for detecting the amount of phase on the surface of the object by using one of the following equations:

$$\Phi(x,y)=k\cdot\{(1-\cos\theta)\cdot d(x,y)/\alpha\}/\{\sin\theta\cdot[1-\{d(x,y)/\alpha\}^2/2]\}$$

$$\Phi(x,y)=k\cdot\tan^{-1}[\{(1-\cos\theta)\cdot d(x,y)/\alpha\}/\{\sin\theta\cdot[1-\{d(x,y)/\alpha\}^2/2]\}]$$

where $\theta$ is the amount of retardation; $\Phi(x,y)$ is the amount of phase on the surface of the object corresponding to the differential image information and the summed image information; when the differential image information is represented by $D(x,y)$, $d(x,y)$ is image information in which the differential image information $D(x,y)$ is deconvoluted by using the optical transfer function of the microscope optical system; when the summed image information is represented by $S(x,y)$, $\alpha$ is the average value of the summed image information $S(x,y)$; and $k=\lambda/4\pi$; where $\lambda$ is a wavelength.

The detection apparatus according to the present invention includes an interference optical system having a light source, an illumination optical path for leading light emitted from the light source to an object, and a reference optical path for leading the light from the light source to a reference surface; and an image pick-up member for photographing an interference image of the object formed by the interference optical system. In this case, the detection apparatus is provided with a processing unit operated through a calculation process for detecting the amount of phase on the surface of the object by using one of the following equations:

$$\Phi(x,y)=k\cdot\{h(x,y)/Jm(x,y)\}/\{[1-\{h(x,y)/Jm(x,y)\}^2/2]\}$$

$$\Phi(x,y)=k\cdot\tan^{-1}[k\cdot\{h(x,y)/Jm(x,y)\}/\{[1-\{h(x,y)/Jm(x,y)\}^2/2]\}]$$

where when image information in which the phase distribution of the object is picturized is represented by $H(x,y)$, $h(x,y)$ is image information in which the image information $H(x,y)$ is deconvoluted by using the optical transfer function of the interference optical system; when image information in which an intensity distribution is picturized is represented by $J(x,y)$, $Jm(x,y)$ is image information in which the maxima of the image information $J(x,y)$ are enveloped; $\Phi(x,y)$ is the amount of phase on the surface of the object; and $k=\lambda/4\pi$, where $\lambda$ is a wavelength.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
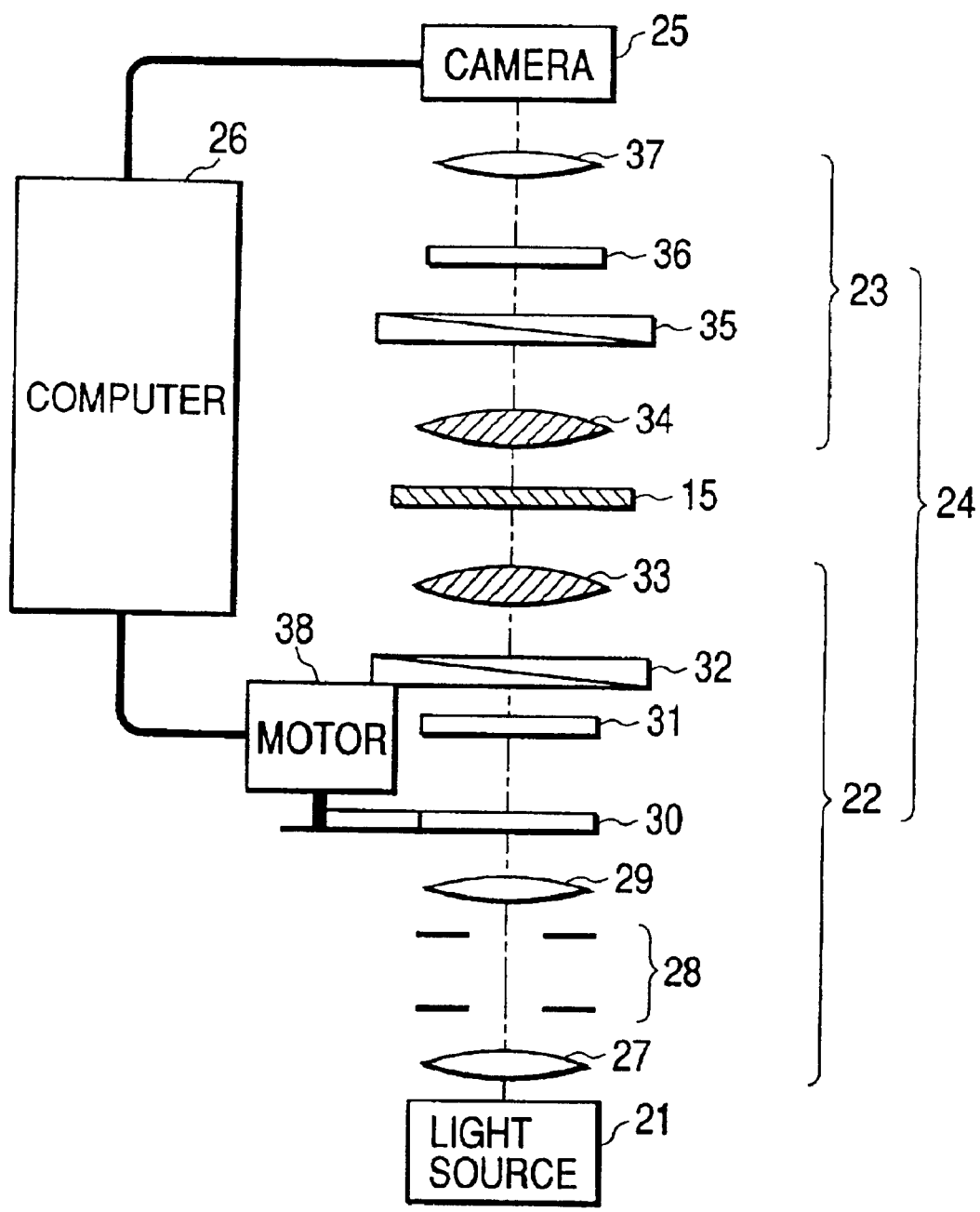
FIG. 1 is a view showing the construction of an apparatus for detecting the physical amount of an object in the present invention.

The detection apparatus of the present invention includes a DIC microscope having a light source, an illumination optical system for introducing light emitted from the light source into an object to be observed, provided with a member for splitting the light from the light source into two polarized components, and an imaging optical system for forming an image of the object, provided with a member for recombining the two polarized components split in the illumination optical system; an adjusting member for changing the amount of retardation between the two polarized components; an image pick-up member for photographing the image of the object; and a processing unit for performing a calculation with respect to the image captured by this image pick-up member.

In the detection apparatus of the present invention, amounts of retardation between the two polarized components split in the illumination optical system are detected to form two differential interference contrast images relative to the object in which the amounts of retardation between the polarized components are equal, but have different signs. Subsequently, in the two differential interference contrast images, a differential calculation and a summed calculation are performed with regard to respective corresponding pixels to obtain a differential image and a summed image. The ratio of image information between the differential image and the summed image is calculated, and from the result of this calculation, image information in a predetermined range is extracted. In this way, the phase of the object can be detected (a first method).

In the detection apparatus of the present invention, the amounts of retardation between the two polarized components split in the illumination optical system are detected to form two differential interference contrast images relative to the object in which the amounts of retardation between the polarized components are equal, but have different signs. Subsequently, in the two differential interference contrast images, a differential calculation and a summed calculation are performed with regard to respective corresponding pixels to obtain differential image information and summed image information. When the detected amount of retardation between the polarized components is represented by $\theta$, the differential image information is represented by $D(x,y)$, the summed image information is represented by $S(x,y)$, the amount of phase on the surface of the object corresponding to each image information is represented by $\Phi(x,y)$, image information in which the differential image information $D(x,y)$ is deconvoluted by using the optical transfer function of the DIC microscope is represented by d(x,y), the average value of the summed image information S(x,y) is represented by α, and k=λ/4π, where λ is a wavelength, one of the following equations is used and thereby the amount of phase Φ(x,y) on the surface of the object can be detected (the first method):

$$\Phi(x,y)=k\cdot\{(1-\cos\theta)\cdot d(x,y)/\alpha\}/\{\sin\theta\cdot[1-\{d(x,y)/\alpha\}^2/2]\} \quad (1)$$

$$\Phi(x,y)=k\cdot\tan^{-1}[\{(1-\cos\theta)\cdot d(x,y)/\alpha\}/\{\sin\theta\cdot[1-\{d(x,y)/\alpha\}^2/2]\}] \quad (2)$$

In the detection apparatus of the present invention, the same procedure as in the first method is followed to obtain the differential image information and the summed image information, and when image information in which the maxima of the summed image information S(x,y) are enveloped is denoted by β(x,y), one of the following equations is used and thereby the amount of phase Φ(x,y) can be detected (a second method):

$$\Phi(x,y)=k\cdot\{(1-\cos\theta)\cdot d(x,y)/\beta(x,y)\}/\{\sin\theta\cdot[1-\{d(x,y)/\beta(x,y)\}^2/2]\} \quad (3)$$

$$\Phi(x,y)=k\cdot\tan^{-1}[\{(1-\cos\theta)\cdot d(x,y)/\beta(x,y)\}/\{\sin\theta\cdot[1-\{d(x,y)/\beta(x,y)\}^2/2]\}] \quad (4)$$

In the detection apparatus of the present invention, the same procedure as in the first method is followed to obtain the differential image information and the summed image information, and when image information in which the information of a low-frequency component is extracted from the summed image information S(x,y) is denoted by Γ(x,y), one of the following equations is used and thereby the amount of phase Φ(x,y) can be detected (a third method):

$$\Phi(x,y)=k\cdot\{(1-\cos\theta)\cdot d(x,y)\}/\{\sin\theta\cdot\Gamma(x,y)\} \quad (5)$$

$$\Phi(x,y)=k\cdot\tan^{-1}[k\cdot\{(1-\cos\theta)\cdot d(x,y)\}/\{\sin\theta\cdot\Gamma(x,y)\}] \quad (6)$$

The amount of phase can also be detected from an interference image obtained by a common interference microscope, and thus this detection method will be described below.

When image information in which the phase distribution of the object is picturized by the interference microscope is denoted by H(x,y), image information in which the image information H(x,y) is deconvoluted by using the optical transfer function of the interference microscope is denoted by h(x,y), image information in which an intensity distribution is picturized is denoted by J(x,y), and image information in which the maxima of the image information J(x,y) are enveloped is denoted by Jm(x,y), one of the following equations is used and thereby the amount of phase Φ(x,y) can be detected (a fourth method):

$$\Phi(x,y)=k\cdot\{h(x,y)/Jm(x,y)\}/\{[1-\{h(x,y)/Jm(x,y)\}^2/2]\} \quad (7)$$

$$\Phi(x,y)=k\cdot\tan^{-1}[k\cdot\{h(x,y)/Jm(x,y)\}/\{[1-\{h(x,y)/Jm(x,y)\}^2/2]\}] \quad (8)$$

When a value in which the maxima of the image information J(x,y) are averaged is represented by Jc, one of the following equations is used and thereby the amount of phase Φ(x,y) can be detected (a fifth method):

$$\Phi(x,y)=k\cdot\{h(x,y)/Jc\}/\{[1-\{h(x,y)/Jc\}^2/2]\} \quad (9)$$

$$\Phi(x,y)=k\cdot\tan^{-1}[k\cdot\{h(x,y)/Jc\}/\{[1-\{h(x,y)/Jc\}^2/2]\}] \quad (10)$$

When the image information J(x,y) is divided as a particular region and an average value in his region is denoted by Ja(x,y), one of the following equations is used and thereby the amount of phase Φ(x,y) can be detected (a sixth method):

$$\Phi(x,y)=k\cdot\{h(x,y)/Ja(x,y)\}/\{[1-\{h(x,y)/Ja(x,y)\}^2/2]\} \quad (11)$$

$$\Phi(x,y)=k\cdot\tan^{-1}[k\cdot\{h(x,y)/Ja(x,y)\}/\{[1-\{h(x,y)/Ja(x,y)\}^2/2]\}] \quad (12)$$

When image information in which a low-frequency component is extracted from the image information J(x,y) is represented by JL(x,y), one of the following equations is used and thereby the amount of phase Φ(x,y) can be detected (a seventh method):

$$\Phi(x,y)=k\cdot\{h(x,y)/JL(x,y)\}/\{[1-\{h(x,y)/JL(x,y)\}^2/2]\} \quad (13)$$

$$\Phi(x,y)=k\cdot\tan^{-1}[k\cdot\{h(x,y)/JL(x,y)\}/\{[1-\{h(x,y)/JL(x,y)\}^2/2]\}] \quad (14)$$

The present inventor provides a detailed description of the imaging characteristic of the DIC microscope in Hei 9-15504, ranging from the introduction thereof to the result. When an image intensity distribution in the DIC microscope is designated by I(x,y,θ), the transmittance (reflectance) of light relative to the object by T(x,y), the phase information of the DIC microscope by P(x,y), and image intensity information by A(x,y), the imaging characteristics of the DIC microscope can be approximately expressed as $$I(x,y,\theta)=T(x,y)\{(1-\cos\theta)\cdot A(x,y)/2+\sin\theta\cdot P(x,y)\}\text{tm} \quad (15)$$

Substitution of −θ for θ in Eq. (15) gives $$I(x,y,-\theta)=T(x,y)\{(1-\cos\theta)\cdot A(x,y)/2-\sin\theta\cdot P(x,y)\} \quad (16)$$

Subtraction of Eq. (16) from Eq. (15) and addition of Eq. (15) to Eq. (16) lead to the following expressions:

$$I(x,y,\theta)-I(x,y,-\theta)=2T(x,y)\cdot\sin\theta\cdot P(x,y) \quad (17)$$

$$I(x,y,\theta)+I(x,y,-\theta)=T(x,y)\cdot(1-\cos\theta)\cdot A(x,y) \quad (18)$$

Thus, by acquiring the differential image information and the summed image information, it becomes possible to separate the phase information and the image intensity information from two differential interference contrast images.

The method of combining a fringe scanning technique employed for interference measurement with the operation of the DIC microscope to thereby measure the phase distribution of the object is disclosed in Hei 5-149719. In general, when the fringe scanning technique is combined with the DIC microscope, four differential interference contrast images in which the amounts of retardation between the polarized components are 0, π/2, π, and 3π/2 are formed, and respective pixel data corresponding to the four differential interference contrast images are used to perform the following calculation:

$$\tan^{-1}[\{I(\pi/2)-I(3\pi/2)\}/\{I(0)-I(\pi)\}] \quad (19)$$

In this way, the phase information of the object is obtained.

The fringe scanning technique for interference measurement is used on the premise that the diffraction and scattering of light are not produced on the surface of the object. In the DIC microscope, however, light diffracted by the surface of the object is converted into a differential interference contrast image, and thus, as show in Eq. (15), an image combining the phase information with the intensity information is obtained.

When images in which the amounts of retardation θ between the polarized components are ±π/2 are captured to form a differential image and a summed image, information corresponding to the term {I(π/2)−I(3π/2)} in Eq. (19) is derived from the differential image. In the DIC microscope, therefore, the images of θ=±π/2 are used and thereby the same information as in the fringe scanning technique is obtained. Also, for any amount of retardation θ, the sane effect is secured.

$$P(x, y) = \int_{-\infty}^{\infty}\int_{-\infty}^{\infty} \sin\{\pi(\Delta_x f_x + \Delta_y f_y)\} M(f_x, f_y) \Phi(f_x, f_y) \cdot \exp\{2i\pi(f_x x + f_y y)\} df_x df_y \qquad (20)$$

$$A(x, y) =$$
$$1 - \int_{-\infty}^{\infty}\int_{-\infty}^{\infty} \cos\{\pi(\Delta_x f_x + \Delta_y f_y)\} M(f_x, f_y) \cdot \Phi(f_x, f_y) \otimes \Phi \cdot (f_x, f_y) \exp\{2i\pi(f_x x + f_y y)\} df_x df_y +$$
$$\int_{-\infty}^{\infty}\int_{-\infty}^{\infty} T(f_x, f_y) \Phi(f_x, f_y) \Phi \cdot (-f_x, -f_y) \cdot \exp\{4i\pi(f_x x + f_y y)\} df_x df_y \text{ where}$$

$$M(f_x, f_y) = \int_{-\infty}^{\infty}\int_{-\infty}^{\infty} Q(\xi, \varsigma) R(\xi, \varsigma) \cdot R(\xi + f_x, \varsigma + f_y) d\xi d\varsigma \qquad (21)$$

$$T(f_x, f_y) = \int_{-\infty}^{\infty}\int_{-\infty}^{\infty} Q(\xi, \varsigma) R(\xi + f_x, \varsigma + f_y) R \cdot (\xi - f_x, \varsigma - f_y) d\xi d\varsigma$$

Hence, the amount of retardation between the polarized components is detected by the DIC microscope so that the differential image and the summed image are formed from two differential interference contrast images in which the amounts of retardation between the polarized components are equal, but have different signs. In this way, the ratio between the images is calculated with regard to respective corresponding pixels to find the value of the arc tangent, and thereby the differential value of the amount of phase in a shear direction of the object can be detected. Furthermore, by finding an integral value in the shear direction relative to the differential value, the amount of phase at each point of the object can be measured quantitatively with a higher degree of accuracy.

Since the intensity distribution of the differential interference contrast image varies with the kind of object and the amount of shear of the DIC microscope, the image is captured with the amount of retardation that yields the best intensity distribution to detect the phase, and thereby a measurement with high accuracy becomes possible.

Where the amount of phase to be detected is small, the differential value of the amount of phase can be approximately obtained even though the value of the arc tangent is not required, and the amount of phase can also be obtained by integral processing. Since, in this case, the phase distribution of the object is derived from the two differential interference contrast images, time required for measurement can be reduced when compared with the case of a conventional fringe scanning technique.

In the DIC microscope, the image intensity distribution where the amount of retardation between the polarized components is zero differs widely from the case where the amount of retardation is π. Thus, when the fringe scanning technique is applied, an image sensor whose dynamic range is very wide becomes necessary.

In the present invention, an image in which the amount of retardation between the polarized components is π is not particularly required, and thus even though the image sensor with a very wide dynamic range is not used, the measurement is possible.

When the DIC microscope is used to measure the phase distribution of the object, all of light diffracted by the object cannot be obtained as image information because the pupil diameter of the DIC microscope is finite. The imaging characteristic of the DIC microscope is expressed by Eq. (15). The phase information $P(x,y)$ and the image intensity information $A(x,y)$, as shown in the following equations, are convoluted by respective peculiar, optical transfer functions.

As such, in order to correctly find the phase information of the object, it is necessary to consider the optical transfer function of the DIC microscope.

Here, $Q(\xi, \zeta)$ is the pupil function of the illumination optical system, $R(\xi, \zeta)$ is the pupil function of the imaging optical system, $\Delta_x$ and $\Delta_y$ are an x component and a y component, respectively, of the amount of shear, and $f_x$ and $f_y$ are spatial frequencies in x and y directions, respectively.

However, after the differential image is formed, the optical transfer function corresponding to the phase information of the DIC microscope shown in Eq. (20) is used, and the deconvolution processing of the differential image is performed to find the ratio with the summed image. Consequently, the amount of phase of the object can be obtained with accuracy even though integral processing is not performed.

However, if the amount of phase of the object is larger than that of a weak phase region, influences of the second and third terms of Eq. (21) become considerable, In order to find the amount of phase of the object with accuracy, it is necessary to detect zero-order light that is not diffracted or scattered by the object. However, in view of the intensity, the light can be actually detected only in a state where it is mixed with diffracted or scattered light and hence a zero-order light component must be separated from the intensity information.

The separation of the zero-order light component can be done by Fourier-transforming the image intensity information to extract only a low-frequency component. This brings about a reduction in detection time and the effect that the influence of the dynamic range on the image sensor detecting the differential interference contrast image is lessened.

When a phase change of the object is relatively great and the edge of the step exists, scattering of light occurs at the edge. This scattering may be responsible for degradation in accuracy of phase detection. In order to exclude the influence of the scattering, an image where the amount of retardation between the polarized components is zero and images where the amounts of retardation between the polarized components are ±θ are picked up, three in total. Subsequently, the value of $B(x,y)=S(x,y)-2\cdot O(x,y)$ is derived from the differential image information $D(x,y)$ and the summed image information $S(x,y)$ which are obtained from the images where the amounts of retardation between the polarized components are ±θ and image information $O(x,y)$ where the amount of retardation is zero, to find the ratio between the differential image information $D(x,y)$ and $B(x,y)$. In this way, the scattered light at the edge can be removed.

By deconvolution processing, phase detection can be made, taking account of the influence of the optical transfer function of the DIC microscope. Moreover, the image information enveloping the minima of the summed image information is extracted to find the ratio with a deconvolution image of the differential image. Consequently, phase detection can be made, excluding the influence of the scattering light at the edge.

The present invention also provides the method of using the DIC microscope to measure the amount of phase. Even when a phase-contrast microscope disclosed by the present inventor in U.S. Pat. No. 5,751,475 is used, an accurate amount of phase can be likewise detected. In this case, by using the 19th to 25th methods, when the amount of phase of the object is measured by an interference microscope such as a DIC microscope, the influence of diffraction or scattering of light on the surface of the object can be lessened and the amount of phase can be measured with a higher degree of accuracy.

When the height of the step of the object increases, the influences of diffraction and scattering on the object become considerable. This is attributable to the second and third terms of Eq. (21). The phase change itself relative to the step influences the intensity information. Thus, the amount of phase measured by an ordinary fringe scanning technique is such that diffraction and scattering have an influence on the intensity information. If the influences of diffraction and scattering are compensated, a precise phase measurement can be made. From Eq. (21), it is conceivable that the intensity information is severely affected by a component of the square of the phase information. Hence, the phase information measured in a state it undergoes the influences of diffraction and scattering is used to compensate the influence on the intensity information, and thereby a measurement accuracy can be improved.

In the DIC microscope, the influences of diffraction and scattering can be compensated and a measurement accuracy can also be improved. Furthermore, when the phase information undergoing the influences of diffraction and scattering is found, the optical transfer function of the imaging optical system is taken into account for deconvolution processing, and thereby a measurement accuracy can be further improved.

When the phase information undergoing the influences of diffraction and scattering is found, the fringe scanning technique is combined with the operation of the DIC microscope to make measurements, and the phase information thus obtained is used for compensation. In this way, the influences of diffraction and scattering can be compensated. Moreover, by deconvolution processing, a measurement accuracy can be further improved.

This compensating technique is not inherent in the DIC microscope. Phase information found from an interference image obtained by a common interferometer is used for compensation and a measurement accuracy can also be improved.

In accordance with the embodiments, the present invention will be described in detail below.

First Embodiment

This embodiment provides a detection method using a phase grating for the measurement of the amount of phase of a phase object. The first embodiment uses a detection apparatus incorporating a transmission type DIC microscope. This apparatus is shown schematically in FIG. 1.

The detection apparatus used in the first embodiment, as shown in FIG. 1, is constructed with a DIC microscope 24 comprised of a light source 21, an illumination optical system 22, and an imaging optical system 23; a CCD camera 25 for photographing an image obtained by the DIC microscope 24; and a microcomputer 26 for making a calculation with respect to the image photographed by the CCD camera 25.

The illumination optical system 22 includes a lens 27, stops 28, a lens 29, a polarizer 30, a quarter-wave plate 31, a Nomarski prism 32, and a condenser lens 33. The imaging optical system 23 includes an objective lens 34, a Nomarski prism 35, an analyzer 36, and a lens 37.

In the detection apparatus shown in FIG. 1, light emitted from a light source 21, after being polarized by the polarizer 30, is transmitted through the quarter-wave plate 31. By the Nomarski prism 32 placed so that a separation point between an ordinary ray and an extraordinary ray is localized at the pupil position of the condenser lens 33, the ordinary and extraordinary rays are separated by a predetermined amount of shear, through the condenser lens 33, on an object 15. The ordinary and extraordinary rays transmitted through the object 15, after traveling through the objective lens 34, are recombined by the Nomarski prism 35 placed so that a combination point between the ordinary and extraordinary rays is localized at the pupil position of the objective lens 34. Subsequently, when the ordinary and extraordinary rays are transmitted through the analyzer 36, they interfere with each other to form a differential interference contrast image of the object 15, through the lens 37, on the image pickup surface of the CCD camera 25.

In the first embodiment, an interference filter is placed in the light source 21 and is set so that illumination light emerging therefrom changes to quasi-monochromatic light with a wavelength of 550 nm. The polarizer 30 can be rotated about the optical axis. Moreover, the polarizer 30 is connected to a pulse motor 38, which can be controlled by the microcomputer 26 so that the angle of rotation of the polarizer 30 is arbitrarily set. As such, the rotation of the pulse motor 38 is controlled by the microcomputer 26, and thereby the amount of retardation between the polarized components can be set through the polarizer 30. The quarter-wave plate 31 is fixed so that the orientation of its fast axis or slow axis coincides with that of polarization of the analyzer 36.

In the first embodiment, first of all, a homogeneous phase object is observed to derive an image intensity distribution while rotating the polarizer 30 and find the angle of rotation of the polarizer 30 and a change of the amount of retardation between the polarized components.

Subsequently, the polarizer 30 is rotated so that the amount of retardation between the polarized components becomes $\theta$, to capture the image of the object 15. In this case, the angle of rotation of the polarizer 30 is detected by the microcomputer 26, and at the same time, the amount of retardation between the polarized components is stored in the microcomputer 26. Similarly, the polarizer 30 is rotated so that the amount of retardation between the polarized components becomes $-\theta$, to capture the image of the object 15. In this case, the angle of rotation of the polarizer 30 is detected by the microcomputer 26, and at the same time, the amount of retardation between the polarized components is stored in the microcomputer 26. In this way, a differential image and a summed image are formed from two images in which the amounts of retardation between the polarized components are $\theta$ and $-\theta$. Consequently, the differential image information $D(x,y)$ and the summed image information $S(x,y)$ are obtained.

Figure 2:
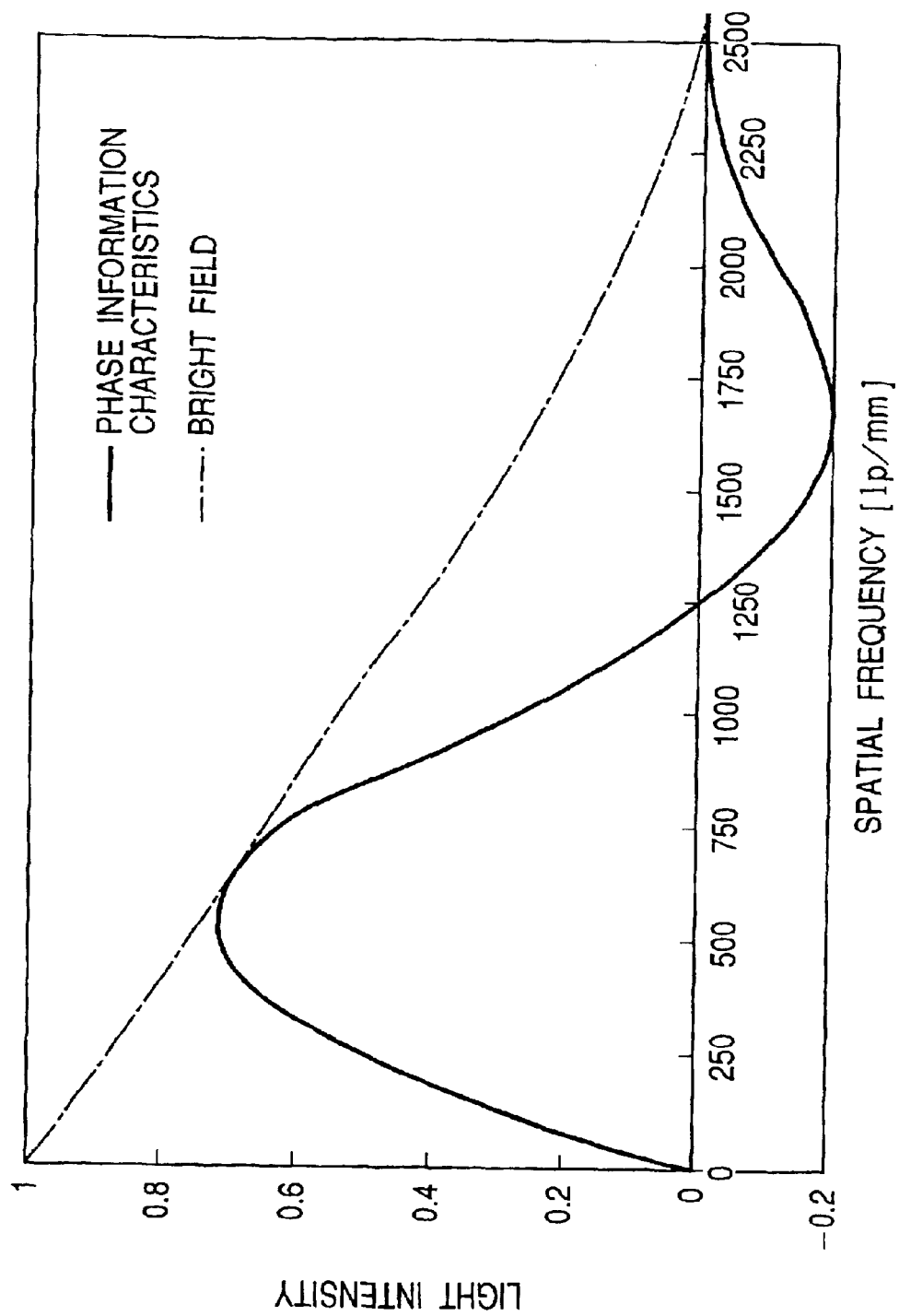
FIG. 2 is a graph showing the optical transfer function of a DIC microscope.

Next, the differential image thus formed is deconvoluted in the microcomputer 26, using the optical transfer function of the DIC microscope shown in FIG. 2, and a phase information image taking account of the optical transfer function is formed to acquire the image information d(x,y). After that, each image information obtained in this way is divided by the summed image to find the value of the arc tangent, which is multiplied by the following value derived from the amount of retardation θ between the polarized components which has been detected. This result is converted into the phase distribution, and the amount of phase Φ(x,y) is obtained.

$$k \cdot (1-\cos\theta)/2 \sin\theta \qquad (22)$$

where k=λ/4π (λ=550 nm). Also, depending on a difference in calculation procedure relative to processing where the phase distribution is picturized from the interference image of the interference microscope, processing where the summed image information is derived from the DIC microscope, or deconvolution processing, k=λ/2 is set and thereby a good result may be attained.

Figure 3A:
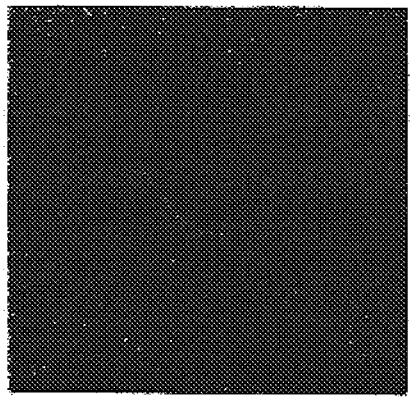
FIGS. 3A and 3B are photographs showing differential interference contrast images relative to the object where the apparatus of FIG. 1 is used and the amounts of retardation between polarized components obtained by a method according to a first embodiment are $\theta$ and $-\theta$, respectively.
Figure 3B:
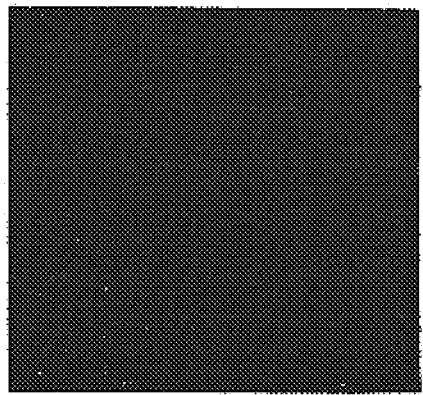
Figure 3C:
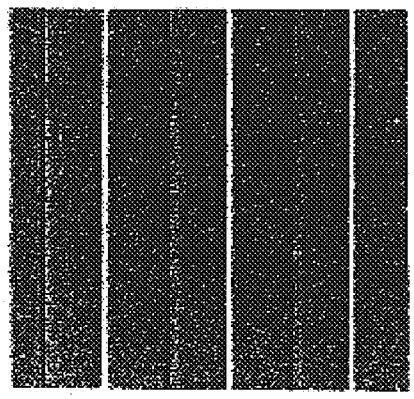
FIGS. 3C and 3D are photographs showing a differential image and a summed image which are formed from the images of FIGS. 3A and 3B, respectively.
Figure 3D:
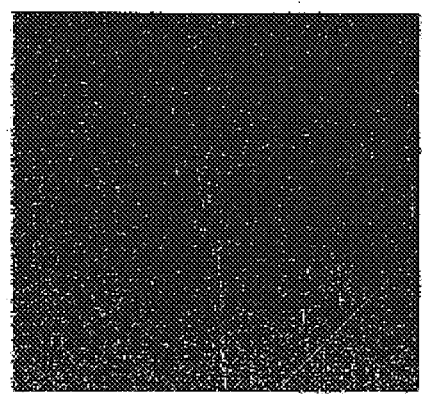
Figure 4:
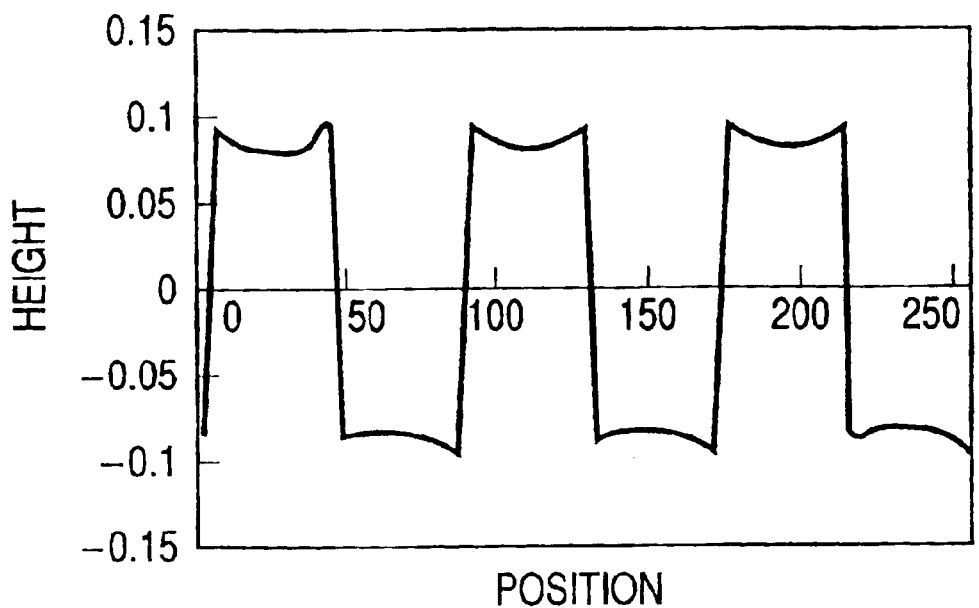
FIG. 4 is a view showing the reproduction of a phase distribution in the present invention.

FIGS. 3A and 3B show images relative to the phase object where the amounts of retardation between the polarized components are θ and −θ. FIGS. 3C and 3D show a differential image and a summed image, respectively, derived from the images of FIGS. 3A and 3B. FIG. 4 shows a reproduction diagram (a sectional view of a grating) of a phase distribution in this case.

Figure 5:
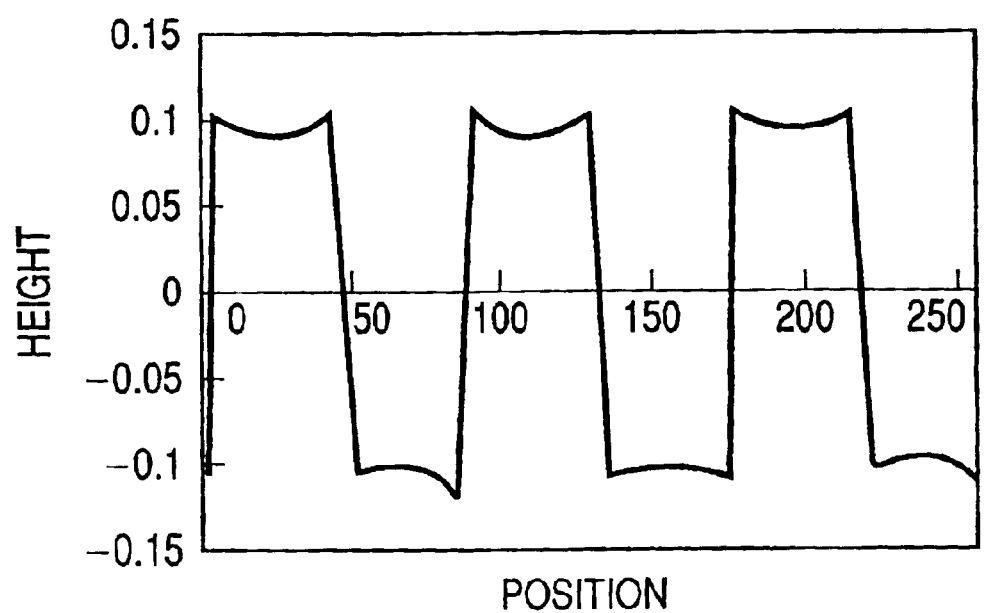
FIG. 5 is a view showing the reproduction of a phase distribution detected by a conventional fringe scanning technique.

For reference, the sectional view of a grating that reproduces a phase distribution where a conventional fringe scanning technique is used to perform deconvolution processing is shown in FIG. 5.

According to the first embodiment, as mentioned above, it is found that the phase distribution of the object, which is the same as in the measurement with the conventional fringe scanning technique, is derived from two images in which the amounts of retardation between the polarized components are ±θ. In particular, the conventional fringe scanning technique needs four images of different amounts of retardation between the polarized components. In the present invention, by contrast, the same phase distribution as in the conventional fringe scanning technique can be obtained only by using two images of different amounts of retardation between the polarized components, and hence measuring time can be reduced.

In the detection method of the first embodiment, when it is previously known that the amount of phase of the object to be observed is relatively small, the approximation of tan φ=φ is established. Thus, a process for finding the value of the arc tangent can be omitted, and the measuring time can be further reduced. Even where the image after the ratio between the differential image and the summed image has been obtained is deconvoluted, the same result is brought about.

The optical transfer function of the DIC microscope is governed by the diameter of the aperture stop of the illumination optical system. The phase distribution is sometimes shifted to a particular spatial frequency band, depending on the kind of object. For the phase detection of such an object, the optical transfer function can be maintained with a value close to 1 by a proper choice of the diameter of the aperture stop, and hence the phase distribution can be correctly obtained without deconvolution processing.

Although in the first embodiment the detection of the amount of retardation between the polarized components is performed by detecting the angle of rotation of the polarizer 30, a means for detecting the amount of retardation between the polarized components may be added to the detection apparatus so that a signal fed from this detecting means is used to find the amount of retardation between the polarized components.

When the amount of retardation between the polarized components is varied, not only is the polarizer 30 rotated, but also a liquid crystal element is interposed between the polarizer 30 and the quarter-wave plate 31 to change the applied voltage of the liquid crystal element Alternatively, a half-wave plate is removably disposed between the polarizer 30 and the quarter-wave plate 31. Even when such a technique is used, the same effect is brought about.

The first embodiment shows an example where a transmission observation is made, but even when a reflection type DIC microscope is used, the same phase distribution can be obtained. In this microscope, however, when the object is a reflective object such as a metal, the value of the phase distribution to be detected is doubled. In such a case, therefore, it is necessary to find the phase distribution as k=λ/8π in Eq. (22). (However, depending on a difference in calculation procedure, k=λ/4π may be set).

The first embodiment provides a specific method of finding the phase distribution of the object from two images in which the amounts of retardation between the polarized components are ±θ. Similarly, two images in which the amounts of retardation between the polarized components are ±θ and an image in which the amount of retardation between the polarized components is zero are captured (the image information in this case is assumed to be O(x,y)). A value twice the image information in which the amount of retardation between the polarized components is zero is subtracted from the image shown in FIG. 3D to find B(x,y), where B(x,y)=S(x,y)−2·O(x,y). The ratio between the differential image shown in FIG. 3C and B(x,y) is obtained, and thereby a phase distribution in which the influence of scattering of light at the edge of the object is excluded can be detected.

In the present invention, reference has been made to the method of photographing the images with a single image-pickup member (CCD camera) while varying the amount of retardation between the polarized components. However, the present invention is not limited to the use of a single image-pickup member, and even when two image-pickup members are used, the same effect can be brought about.

Figure 6:
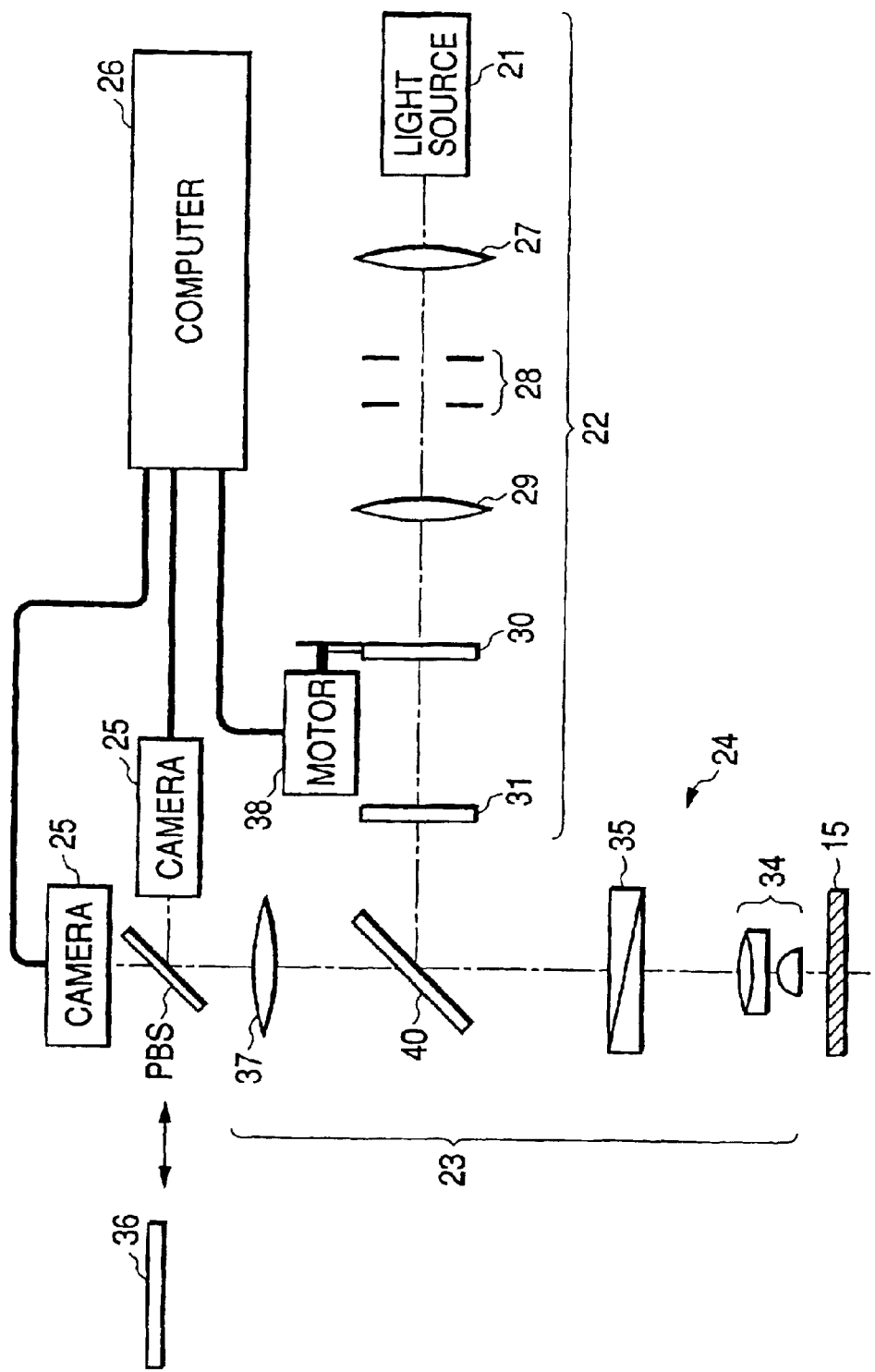
FIG. 6 is a view showing another example of an apparatus for detecting the physical amount of the object in the present invention.
Figure 7:
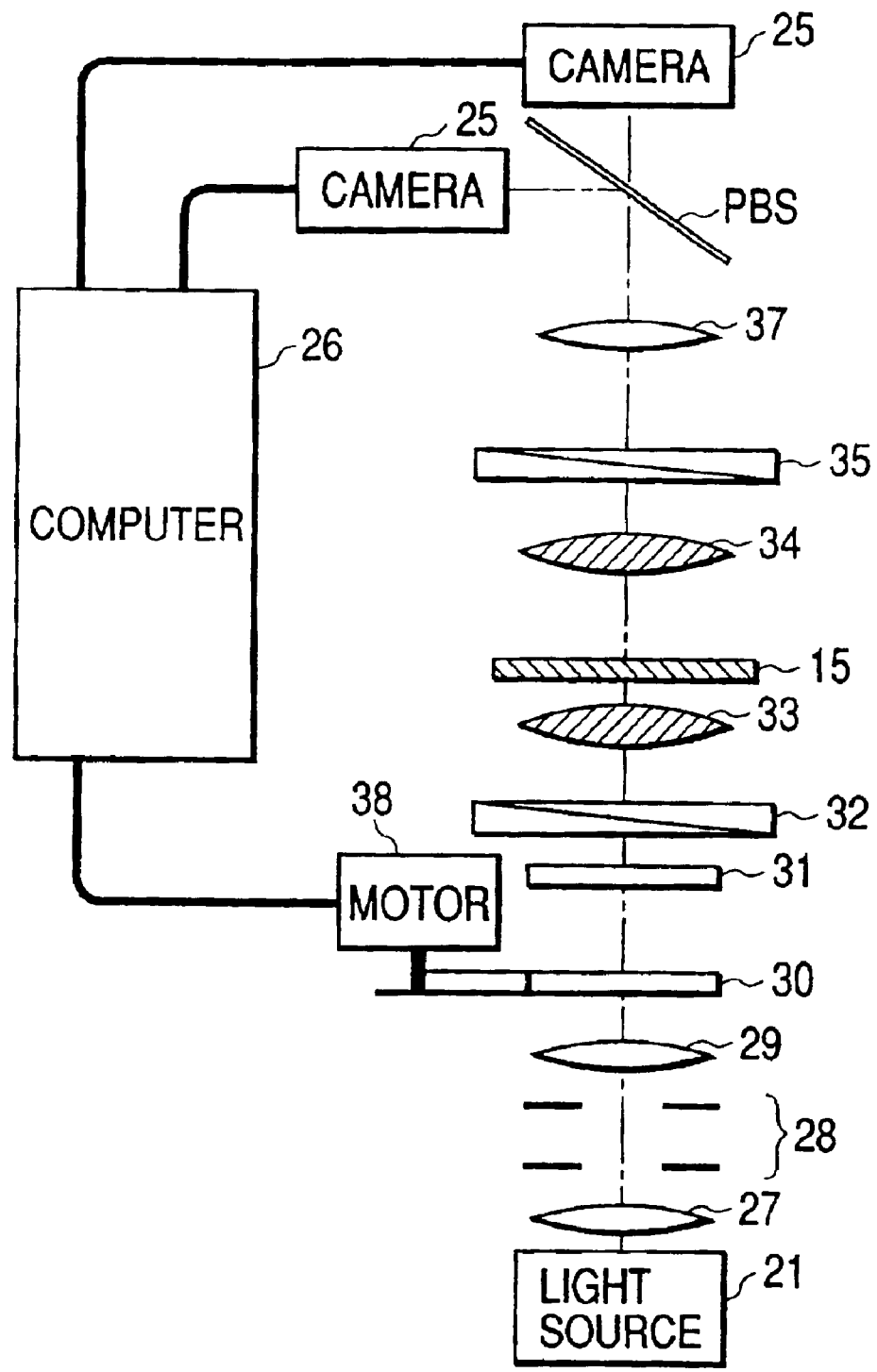
FIG. 7 is a view showing still another example of an apparatus for detecting the physical amount of an object in the present invention.

For example, as shown in each of FIGS. 6 and 7, instead of the analyzer 36 of FIG. 1, a polarization beam splitter PBS may be placed in an observation optical system to slit light into two polarized components vibrating perpendicular to each other so that individual polarized components are received by two CCD cameras 25. Here, reference numeral 40 represents a half mirror. By doing so, differential interference contrast images in which the amounts of retardation between the polarized components are equal, but have different signs are formed, one on each of the image pickup surfaces of the two CCD cameras.

Thus, calculations relative to the images obtained by the two CCD cameras allow the detection of physical amounts such as the gradient, planar portion, birefringent portion, distortion, step edge, and phase distribution of the object.

Second Embodiment

This embodiment provides a method of compensating the influences of diffraction and scattering of light on an object and measuring a correct amount of phase from phase information detected by using a DIC microscope. In the second embodiment, the DIC microscope for detecting the phase information of the object is the same as that used in the fast embodiment, and the measurement is made with respect to the phase grating, like the first embodiment, as an example.

Figure 8A:
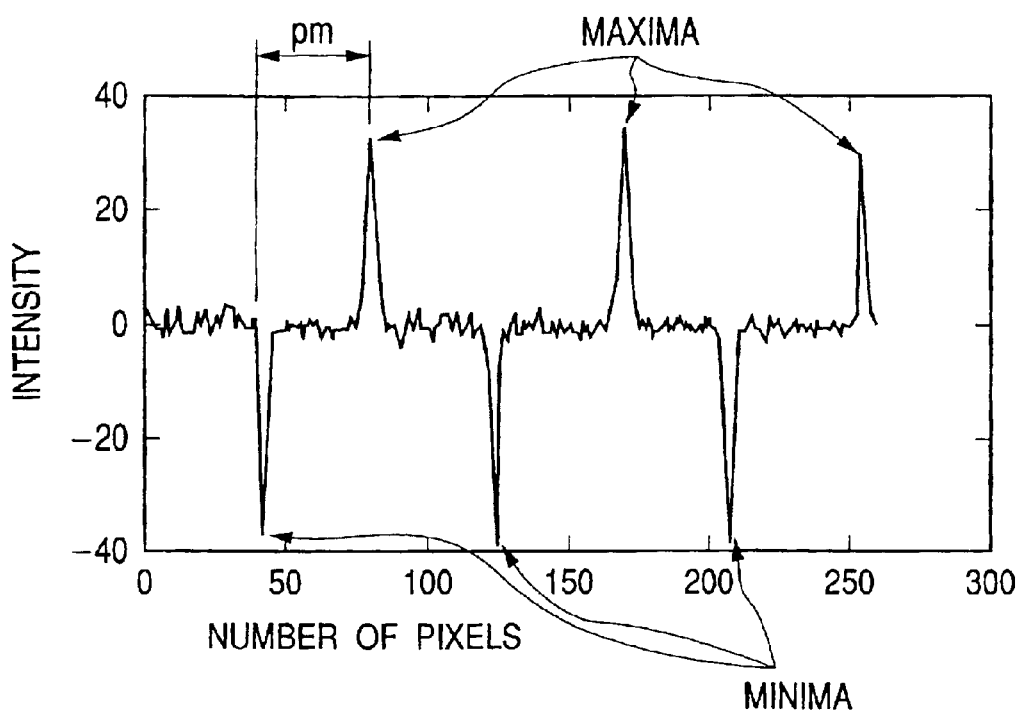
FIGS. 8A and 8B are diagrams showing intensity distributions of the images of FIGS. 3C and 3D, respectively.
Figure 8B:
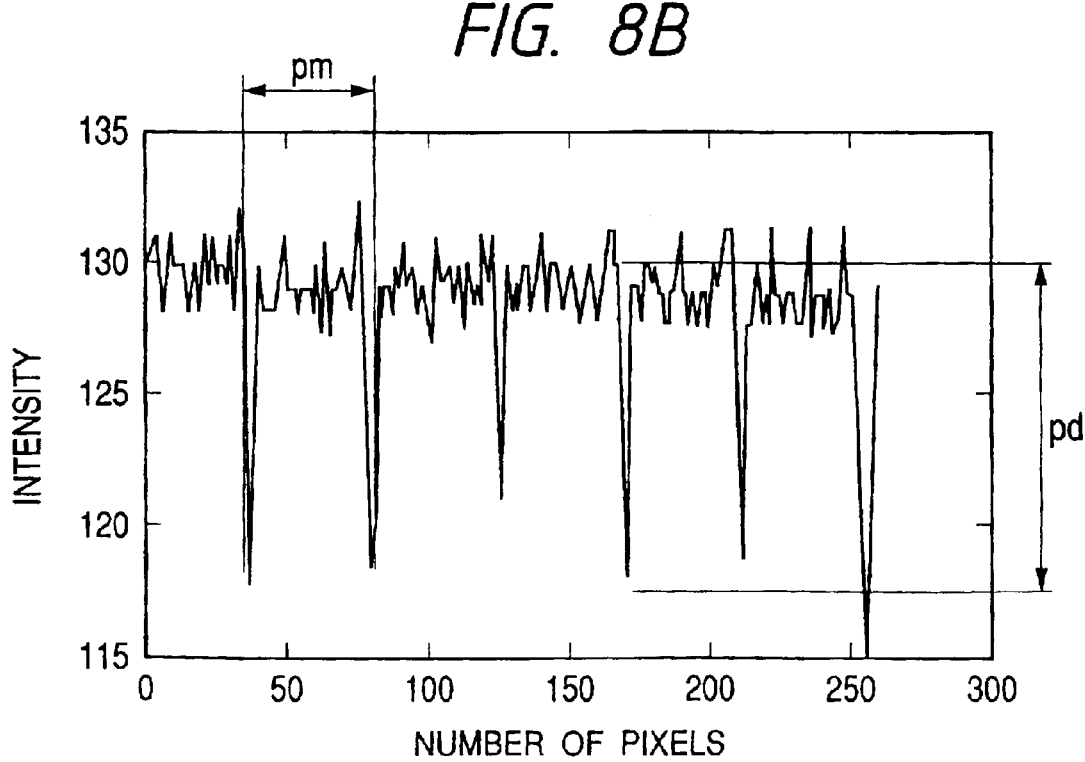

The differential interference contrast images shown in FIGS. 3A and 3B are photographed, and the differential image and the summed image in FIGS. 3C and 3D are formed. The sectional intensity distributions of the images of FIGS. 3C and 3D are shown in FIGS. 8A and 8B, respectively. The intensity distribution of FIG. 8A is deconvoluted by using the optical transfer function of the DIC microscope and thereby the phase distribution can be obtained. However, if only the differential image is deconvoluted, it will be dependent on the brightness of illumination where the differential interference contrast image is formed, and the amount of phase cannot be quantitatively measured. In order to solve this problem, it is necessary to form the summed image to find the brightness information of illumination.

For the technique of finding the brightness information, for example, the summed image is divided into particular regions to find the average value α of the image information S(x,y) of the summed image in regard to respective regions. With the average value α as the brightness information representative of one region, image information in which the differential image in the region is deconvoluted is divided by the brightness information and is converted into phase information. In the conversion into the phase information, the arc tangent of the differential image divided by the brightness information is calculated. Where the value of the differential image divided by the brightness information is small, the conversion into the phase information can be carried out even though the arc tangent is omitted.

Figure 10:
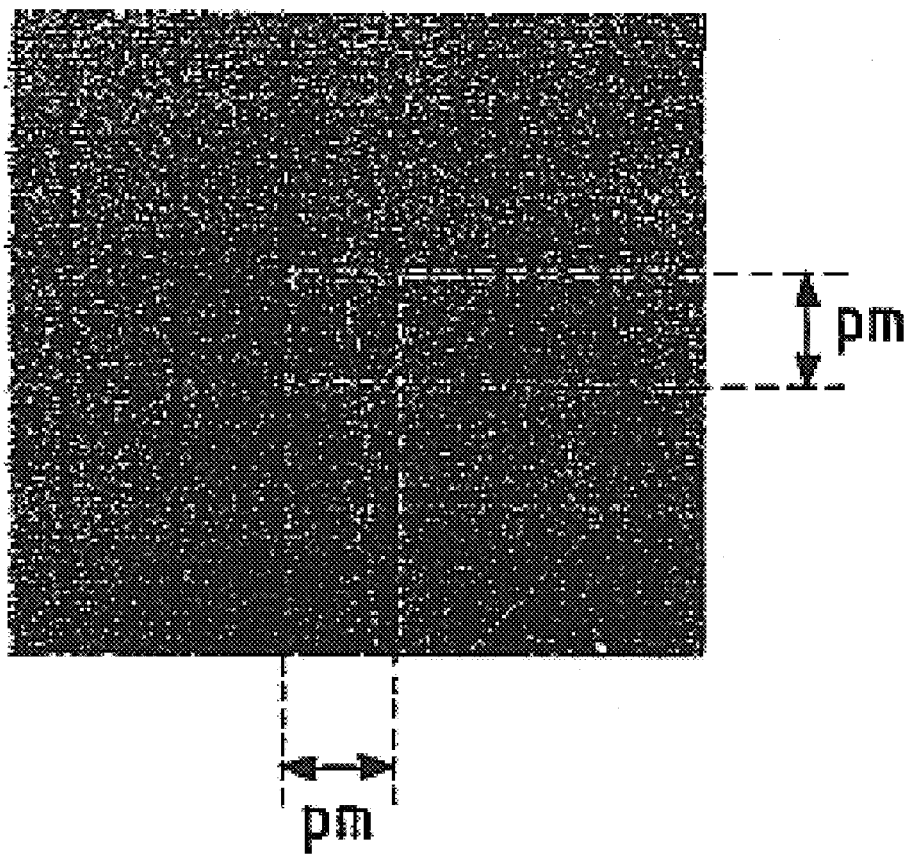
FIG. 10 is a view showing a technique of dividing an image as a region.

For the division of the image, there is the technique that, with a distance pm between the maximum and the minimum of the intensity distribution of the differential image as one side, a square is set to a minimum unit and an arbitrary integral multiple of the square is thought of as one region (FIG. 10), or that an integral multiple of a pixel constituting the image information is thought of as one region.

In general, the image information contains an electric noise of the image sensor and sets up small vibrations (high-frequency vibrations as spatial frequencies) as in FIG. 8B. By eliminating such vibrations, it becomes possible to make a phase measurement with a high degree of accuracy.

Figure 9A:
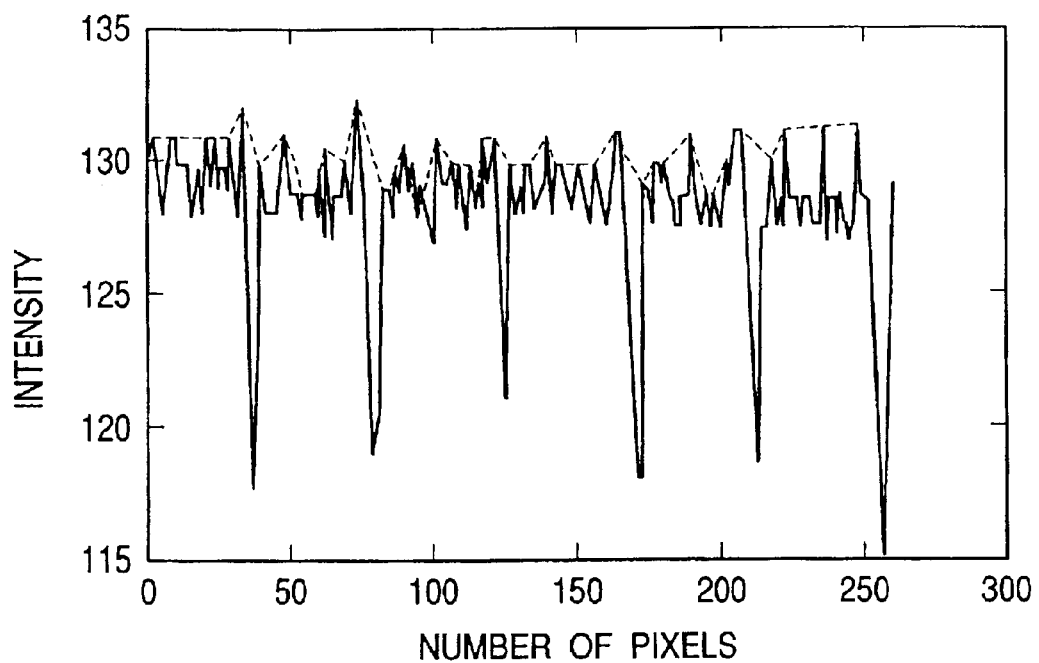
FIGS. 9A and 9B are diagrams showing envelopes which are obtained by connecting the maxima and minima, respectively, of the intensity distribution of FIG. 8B.

Here, a description is given of techniques for excluding the influence of the noise. A first technique is to average the image information as mentioned above. A second technique is that intensity values relative to individual pixels are compared and pixels larger in intensity value than respective adjacent pixels are extracted to obtain the maxima of the intensity distribution, which are connected by a line, as shown in FIG. 9A, to find an envelope. The image information β(x,y) obtained on the basis of this envelope may be used in place of the average value α. In general, a noise component assumes sufficiently fine vibrations with respect to the value pm participating in the length of the object. A third technique is that the image information such as that shown in FIG. 8B is Fourier-transformed to cut off frequency (about 1/pm) components over a particular frequency and is again Fourier-transformed. In this case, since the information of a low-frequency component is extracted from the summed image information S(x,y), the resultant image information Γ(x,y) can also be used. According to this technique, image information in which the noise component is eliminated and an image is sharp can be obtained.

By the above techniques, brightness information in which the influence of the noise is excluded can be acquired. For an object with a small amount of phase, image information in which the differential image is deconvoluted is divided by the brightness information, and thereby the phase information can be obtained quantitatively.

For an object with a relatively large amount of phase, information in which the amount of phase is squared is added to the brightness information. In order to find quantitatively the phase distribution of the object, it is necessary to subtract the information in which the amount of phase is squared, from the brightness information. Subsequently, reference is made to a technique for excluding the influence of the amount of phase which is squared.

Figure 9B:
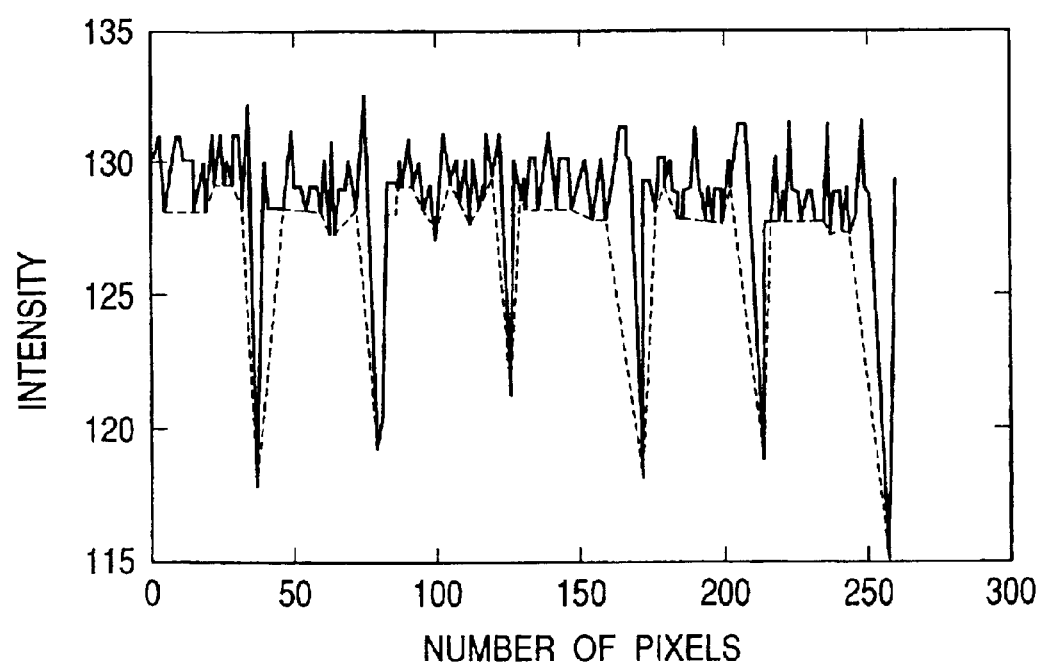

Like the case where the noise component is eliminated from the summed image, intensity values relative to individual pixels are compared and pixels smaller in intensity value than respective adjacent pixels are extracted to obtain the minima of the intensity distribution, which are connected by a line, as shown in FIG. 9B, to find image information with the envelope of the minima. As indicated by the fifth method, the image information in which the differential image is deconvoluted is divided by the image information with the envelope of the minima, or the arc tangent of divided information is made.

The brightness information is extracted from the summed image by the above technique, and the image information in which the differential image is deconvoluted is divided by the brightness information. Consequently, a phase distribution smaller than an actual phase distribution is obtained. The phase distribution thus obtained is used to calculate the squared components of the amount of phase and compensate the brightness information. Thus, the phase distribution is compensated by the equations shown in the first to third methods, and thereby a correct phase distribution can be obtained.

A value pd shown in FIG. 8B, which corresponds to one-half of the square of the amount of phase, is also affected by the optical transfer function of the microscope. Hence, in order to obtain a more correct phase distribution, it is necessary to find the optical transfer function for deconvolution. The first to third methods are such that the brightness information is approximately deconvoluted.

Here, as a technique for compensating the brightness information, the phase distribution obtained by deconvolution processing with respect to the phase information extracted from the differential image information is squared, and after the value of one-half thereof is calculated and is subtracted from 1, the phase distribution is divided by a resultant value for compensation. Alternatively, even when the value of the phase distribution is divided by the square root of the value in which one-half of the squared phase information is subtracted from 1, the same compensation can be made.

Where the extent of the phase distribution of the object is approximately known, the above two compensation techniques are selectively used and a precise measurement of the phase distribution can be made.

In the disclosure so far, reference has been made to the DIC microscope as an example, but this is not a technique inherent in the DIC microscope. The same holds for the phase-contrast microscope disclosed in U.S. Pat. No. 5,751,475.

Figure 11:
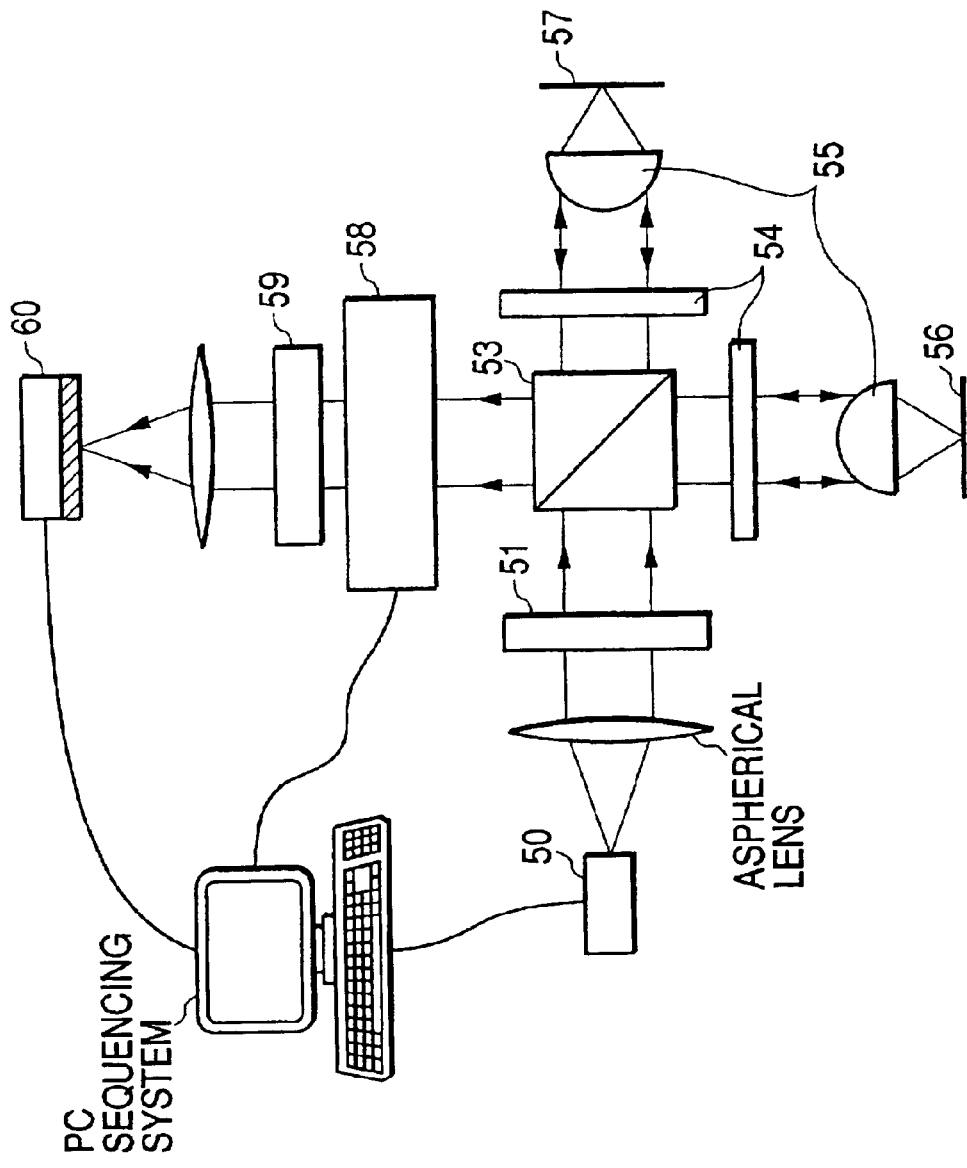
FIG. 11 is a view showing schematically the construction of an apparatus used for a method of finding a correct phase distribution in the present invention.

The present invention is applicable to the analysis of an interference image obtained by a common interference microscope. With reference to FIG. 11, a description is given of a Michelson interference microscope set forth in "Real-time reflectivity and topography imagery of depth-resolved microscopic surfaces", A Dubois, A. C. Boccara, and M. Lebec, OPTICS LETTERS, Vol. 24, No. 5, Mar. 1, 1999, as an interference microscope other than the DIC microscope and the phase-contrast microscope.

In this microscope, light emitted from an LED 50 of a light source is linearly polarized by a polarizer 51, and is separated by a polarizing beam splitter 53 into two polarized components, which pass through quarter-wave plates 54 and enter objective lenses 55. Subsequently, the polarized components, after being reflected by an object 56 and a reference mirror 57, respectively, again pass through the quarter-wave plates 54 and enter the polarizing beam splitter 53. In this case, the two polarized components are introduced into the optical path of a CCD 60 because their planes of polarization are rotated by 90°, and after being transmitted through a photoelastic modulator 58 and an analyzer 59, are received by the CCD 60. The photoelastic modulator 58 is an element capable of changing the amount of phase difference (retardation) between the two polarized components and is capable of controlling relative path differences of two optical paths.

By operating the photoelastic modulator, the image information H(x,y) in which the phase distribution is picturized can be obtained through the fringe scanning technique. However, when the object has a step, diffraction and scattering of light are produced at the step, and thus a brightness component corresponding to the square of the amount of phase is added to the image information H(x,y). Hence, in order to detect the amount of phase Φ(x,y) with accuracy, it is necessary to compensate the component corresponding to the square of the amount of phase.

In this case, an image in which the amount of retardation is 0 or π is formed to find the brightness information and then the phase information through the fringe scanning technique. Using the optical transfer function of a common microscope, the brightness information is deconvoluted to find a more correct phase distribution. This phase distribution is squared and the value of one-half thereof is calculated. This value is subtracted from 1 and the phase distribution is divided by this result to make compensation.

When the fringe scanning technique is used, the brightness information is obtained in this process and thus it is merely necessary to make compensation.

When only the phase information is separated, as indicated by the fourth to seventh methods, compensation is made after the brightness information is obtained, and thereby the phase distribution of the object can be detected with accuracy.

What is claimed is:

1. An optical apparatus comprising:
    a microscope optical system having:
        a light source,
        an illumination optical system that leads light emitted from the light source to an object to be observed,
        an imaging optical system that forms an image of the object, and
        at least one polarizing member that separates the light from the light source into two polarized components;
    an adjusting member that changes an amount of retardation between the two polarized components;
    an image pick-up member that picks up a differential interference contrast image of the object; and
    a computer,
    wherein the computer performs a difference operation and a sum operation for each pair of corresponding pixels in pictures of two differential interference contrast images of the object that are picked up by the image pick-up member and that have retardations equal in amount and different in sign, to obtain difference image information and sum image information, and detects an amount of phase Φ(x,y) on a surface of the object corresponding to image information for each pixel by using one of the following equations:

$$\Phi(x,y)=k\cdot\{(1-\cos\theta)\cdot d(x,y)/\alpha\}/\{\sin\theta\cdot[1-\{d(x,y)/\alpha\}^2/2]\}$$

$$\Phi(x,y)=k\cdot\tan^{-1}[\{(1-\cos\theta)\cdot d(x,y)/\alpha\}/\{\sin\theta\cdot[1-\{d(x,y)/\alpha\}^2/2]\}]$$

where θ is the amount of retardation, D(x,y) is the difference image information, S(x,y) is the sum image information, Φ(x,y) is the amount of phase on the surface of the object corresponding to image information for each pixel, d(x,y) is image information that is yielded by deconvolution of the difference image information D(x,y) using an optical transfer function of the microscope optical system, α is an average value of the sum image information S(x,y), k=λ/4π, and λ is a wavelength.

2. An optical apparatus comprising:
    an interference optical system having:
        a light source,
        an illumination optical path that leads light emitted from the light source to an object to be observed, and
        a reference optical path that leads the light from the light source to a reference surface;
    an image pick-up member that picks up an interference image of the object formed by the interference optical system; and
    a computer,
    wherein the computer detects an amount of phase Φ(x,y) on a surface of the object by using one of the following equations:

$$\Phi(x,y)=k\cdot\{h(x,y)/J_m(x,y)\}/\{[1-\{h(x,y)/Jm(x,y)\}^2/2]\}$$

$$\Phi(x,y)=k\cdot\tan^{-1}[k\cdot\{h(x,y)/Jm(x,y)\}/\{[1-\{h(x,y)/Jm(x,y)\}^2/2]\}]$$

where H(x,y) is image information that is a phase distribution of the object as picturized, h(x,y) is image information that is yielded by deconvolution of the image information H(x,y) using an optical transfer function of the interference optical system, J(x,y) is image information that is an intensity distribution as picturized, $J_m$(x,y) is image information in which maxima of the image information J(x,y) are enveloped, Φ(x,y) is the amount of phase on the surface of the object, k=λ/4π, and λ is a wavelength.

3. An optical apparatus comprising:
    a microscope optical system having:
        a light source,
        an illumination optical system that leads light emitted from the light source to an object to be observed,
        an imaging optical system that forms an image of the object, and
        at least one polarizing member that separates the light from the light source into two polarized components;
    an adjusting member that changes an amount of retardation between the two polarized components;
    an image pick-up member that picks up a differential interference contrast image of the object; and
    a computer,
    wherein the computer performs a difference operation and a sum operation for each pair of corresponding pixels in pictures of two differential interference contrast images of the object that are picked up by the image pick-up member and that have retardations equal in amount and different in sign, to obtain difference image information and sum image information, and detects an amount of phase Φ(x,y) on a surface of the object by using one of the following equations:

$$\Phi(x,y)=k\cdot\{(1-\cos\theta)\cdot d(x,y)/\beta(x,y)\}/\{\sin\theta\cdot[1-\{d(x,y)/\beta(x,y)\}^2/2]\}$$

$$\Phi(x,y)=k\cdot\tan^{-1}[\{(1-\cos\theta)\cdot d(x,y)/\beta(x,y)\}/\{\sin\theta\cdot[1-\{d(x,y)/\beta(x,y)\}^2/2]\}]$$

where $\theta$ is the amount of retardation between the two polarized components, $D(x,y)$ is the difference image information, $S(x,y)$ is the sum image information, $\Phi(x,y)$ is the amount of phase on the surface of the object corresponding to image information for each pixel, $d(x,y)$ is image information that is yielded by deconvolution of the difference image information $D(x,y)$ using an optical transfer function of the microscope optical system, $\beta(x,y)$ is image information in which maxima of the sum image information $S(x,y)$ are enveloped, $k=\lambda/4\pi$, and $\lambda$ is a wavelength.

4. An optical apparatus comprising:

a microscope optical system having:
   a light source,
   an illumination optical system that leads light emitted from the light source to an object to be observed,
   an imaging optical system that forms an image of the object, and
   at least one polarizing member that separates the light from the light source into two polarized components;

an adjusting member that changes an amount of retardation between the two polarized components;

an image pick-up member that picks up a differential interference contrast image of the object; and a computer, wherein the computer performs a difference operation and a sum operation for each pair of corresponding pixels in pictures of two differential interference contrast images of the object that are picked up by the image pick-up member and that have retardations equal in amount and different in sign, to obtain difference image information and sum image information, and detects an amount of phase $\Phi(x,y)$ on a surface of the object corresponding to image information for each pixel by using one of the following equations:

$$\Phi(x,y)=k\cdot\{(1-\cos\theta)\cdot d(x,y)\}/\{\sin\theta\cdot\Gamma(x,y)\}$$

$$\Phi(x,y)=k\cdot\tan^{-1}[k\cdot\{(1-\cos\theta)\cdot d(x,y)\}/\{\sin\theta\cdot\Gamma(x,y)\}]$$

where $\theta$ is the amount of retardation between the two polarized components as detected, $D(x,y)$ is the difference image information, $S(x,y)$ is the sum image information, $\Phi(x,y)$ is the amount of phase on the surface of the object corresponding to image information for each pixel, $d(x,y)$ is image information that is yielded by deconvolution of the difference image information $D(x,y)$ using an optical transfer function of the microscope optical system, $\Gamma(x,y)$ is image information that is composed of information of a low-frequency component extracted from the sum image information $S(x,y)$, $k=\lambda/4\pi$, and $\lambda$ is a wavelength.

5. An optical apparatus comprising:

an interference optical system having:
   a light source,
   an illumination optical path that leads light emitted from the light source to an object to be observed, and
   a reference optical path that leads the light from the light source to a reference surface;

an image pick-up member that picks up an interference image of the object formed by the interference optical system; and a computer, wherein the computer detects an amount of phase $\Phi(x,y)$ on a surface of the object by using one of the following equations:

$$\Phi(x,y)=k\cdot\{h(x,y)/Jc\}/\{[1-\{h(x,y)/Jc\}^2/2]\}$$

$$\Phi(x,y)=k\cdot\tan^{-1}[k\cdot\{h(x,y)/Jc\}/\{[1-\{h(x,y)/Jc\}^2/2]\}]$$

where $H(x,y)$ is image information that is a phase distribution of the object as picturized by the interference optical system, $h(x,y)$ is image information that is yielded by deconvolution of the image information $H(x,y)$ using an optical transfer function of the interference optical system, $J(x,y)$ is image information that is an intensity distribution as picturized, $J_c$ is an average value of maxima of the image information $J(x,y)$, $\Phi(x,y)$ is the amount of phase on the surface of the object, $k=\lambda/4\pi$, and $\lambda$ is a wavelength.

6. An optical apparatus comprising:

an interference optical system having:
   a light source,
   an illumination optical path that leads light emitted from the light source to an object to be observed, and
   a reference optical path that leads the light from the light source to a reference surface;

an image pick-up member that picks up an interference image of the object formed by the interference optical system; and a computer, wherein the computer detects an amount of phase $\Phi(x,y)$ on a surface of the object by using one of the following equations:

$$\Phi(x,y)=k\cdot\{h(x,y)/Ja(x,y)\}/\{[1-\{h(x,y)/Ja(x,y)\}^2/2]\}$$

$$\Phi(x,y)=k\cdot\tan^{-1}[k\cdot\{h(x,y)/Ja(x,y)\}/\{[1-\{h(x,y)/Ja(x,y)\}^2/2]\}]$$

where $H(x,y)$ is image information that is a phase distribution of the object as picturized by the interference optical system, $h(x,y)$ is image information that is yielded by deconvolution of the image information $H(x,y)$ using an optical transfer function of the interference optical system, $J(x,y)$ is image information that is an intensity distribution as picturized, $J_a(x,y)$ is an average value of the image information $J(x,y)$ as calculated for a predetermined region therein, $\Phi(x,y)$ is the amount of phase on the surface of the object, $k=\lambda/4\pi$, and $\lambda$ is a wavelength.

7. An optical apparatus comprising:

an interference optical system having:
   a light source,
   an illumination optical path that leads light emitted from the light source to an object to be observe, and
   a reference optical path that leads the light from the light source to a reference surface;

an image pick-up member that picks up an interference image of the object formed by the interference optical system; and a computer, wherein the computer detects an amount of phase on a surface of the object by using one of the following equations:

$$\Phi(x,y)=k\cdot\{h(x,y)/JL(x,y)\}/\{[1-\{h(x,y)/JL(x,y)\}^2/2]\}$$

$$\Phi(x,y)=k\cdot\tan^{-1}[k\cdot\{h(x,y)/JL(x,y)\}/\{[1-\{h(x,y)/JL(x,y)\}^2/2]\}]$$

where H(x,y) is image information that is a phase distribution of the object as picturized by the interference optical system, h(x,y) is image information that is yielded by deconvolution of the image information H(x,y) using an optical transfer function of the interference optical system, J(x,y) is image information that is an intensity distribution as picturized, $J_L(x,y)$ is image information that is composed of information of a low-frequency component extracted from the image information J(x,y), $\Phi(x,y)$ is the amount of phase on the surface of the object, k=λ/4π, and λ is a wavelength.

8. An optical apparatus comprising:
a microscope optical system having:
  a light source,
  an illumination optical system that leads light emitted from said light source to an object to be observed,
  an imaging optical system that forms an image of the object, and
  at least one polarizing member that separates the light from the light source into two polarized components;
an adjusting member that changes an amount of retardation between the two polarized components;
an image pick-up member that picks up a differential interference contrast image of the object; and
a computer,
wherein the computer performs a difference operation and a sum operation for each pair of corresponding pixels in pictures of two differential interference contrast images of the object that are picked up by the image pick-up member and that have retardations equal in amount and different in sign, to obtain difference image information and sum image information, and detects a phase distribution $\Phi(x,y)$ on a surface of the object by using the following equation:

$$\Phi(x,y)=\phi(x,y)/\{1-[\phi(x,y)]^2/2\}$$

where $\phi(x,y)$ is a phase distribution that is calculated from the difference image information and the sum image information and $\Phi(x,y)$ is the phase distribution on the surface of the object.

9. An optical apparatus comprising:
a microscope optical system having:
  a light source,
  an illumination optical system that leads light emitted from the light source to an object to be observed,
  an imaging optical system that forms an image of the object, and
  at least one polarizing member that separates the light from the light source into two polarized components;
an adjusting member that changes an amount of retardation between the two polarized components;
an image pick-up member that picks up a differential interference contrast image of said object; and
a computer,
wherein the computer performs a difference operation and a sum operation for each pair of corresponding pixels in pictures of two differential interference contrast images of the object that are picked up by the image pick-up member and that have retardations equal in amount and different in sign, to obtain difference image information and sum image information, processes the difference image information with a deconvolution operation using an optical transfer function of the imagine optical system, calculates out a phase distribution from the difference image information that has undergone the deconvolution operation and the sum image information, and detects a phase distribution $\Phi(x,y)$ on a surface of the object using the following equation:

$$\Phi(x,y)=\phi_d(x,y)/\{1-[\phi_d(x,y)]^2/2\}$$

where $\phi_d(x,y)$ is the phase distribution calculated out from the difference image information that has undergone the deconvolution operation and the sum image information and $\Phi(x,y)$ is the phase distribution on the surface of the object.

10. An optical apparatus comprising:
a microscope optical system having:
  a light source,
  an illumination optical system that leads light emitted from the light source to an object to be observed,
  an imaging optical system that forms an image of the object, and
  at least one polarizing member that separates the light from the light source into two polarized components;
an adjusting member that changes an amount of retardation between the two polarized components;
an image pick-up member that picks up a differential interference contrast image of object; and
a computer,
wherein the computer detects a phase distribution $\Phi(x,y)$ on a surface of the object from at least three differential interference contrast images that are picked up by the image pick-up member and that have different amounts of retardation by using the following equation:

$$\Phi(x,y)=\phi_f(x,y)/\{1-[\phi_f(x,y)]^2/2\}$$

where $\phi_f(x,y)$ is a phase distribution calculated from the three differential interference contrast images and $\Phi(x,y)$ is the phase distribution on the surface of the object.

11. An optical apparatus comprising:
a microscope optical system having:
  a light source,
  an illumination optical system that leads light emitted from the light source into an object to be observed,
  an imaging optical system that forms an image of the object, and
  at least one polarizing member that separates the light from the light source into two polarized components;
an adjusting member that changes an amount of retardation between the two polarized components;
an image pick-up member that picks up a differential interference contrast image of the object; and
a computer,
wherein the computer calculates out a phase distribution from at least three differential interference contrast images that are picked up by the image pick-up member and that have different amounts of retardation, processes the phase distribution with a deconvolution operation using an optical transfer function of the imaging optical system, and detects a phase distribution $\Phi(x,y)$ on a surface of the object using the following equation:

$$\Phi(x,y)=\phi_{fd}(x,y)/\{1-[\phi_{fd}(x,y)]^2/2\}$$

where $\phi_{fd}(x,y)$ is the phase distribution that has undergone the deconvolution operation and $\Phi(x,y)$ is the phase distribution on the object.

12. An optical apparatus comprising:
an interference optical system having:
   a light source;
   an illumination optical path that leads light emitted from the light source into an object to be observed; and
   a reference optical path that leads the light from the light source to a reference surface;
an image pick-up member that picks up an interference image of the object formed by the interference optical system; and
a computer,
wherein the computer calculates out a phase distribution from an interference image picked up by the image pick-up member and detects a phase distribution on a surface of the object by using the following equation:

$$\Phi(x,y)=\phi_f(x,y)/\{1-[\phi_f(x,y)]^2/2\}$$

where $\phi_f(x,y)$ is the phase distribution calculated out from the photographed interference image and $\Phi(x,y)$ is a phase distribution on the surface of the object.

13. A method for detecting physical amount of object, comprising:
preparing a microscope optical system, the microscope optical system having a light source, an illumination optical system that leads light emitted from the light source to an object to be observed, and an imaging optical system that forms an image of the object;
preparing at least one polarizing member for separating the light from the light source into two polarized components;
preparing an adjusting member for changing an amount of retardation between the two polarized components;
preparing an image pick-up member for picking up a differential interference contrast image of the object;
picking up two differential interference contrast images of the object that have retardations equal in amount and different in sign with the image pick-up member; and
making a computer to conduct a procedure, the procedure comprising the processes of:
   performing a difference operation and a sum operation for each pair of corresponding pixels in pictures of the two differential interference contrast images, to obtain difference image information and sum image information; and
   detecting an amount of phase $\Phi(x,y)$ on a surface of the object corresponding to image information for each pixel by using one of the following equations:

$$\Phi(x,y)=k\cdot\{(1-\cos\theta)\cdot d(x,y)/\alpha\}/\{\sin\theta\cdot[1-\{d(x,y)/\alpha\}^2/2]\}$$

$$\Phi(x,y)=k\cdot\tan^{-1}[\{(1-\cos\theta)\cdot d(x,y)/\alpha\}/\{\sin\theta\cdot[1-\{d(x,y)/\alpha\}^2/2]\}]$$

where $\theta$ is the amount of retardation, D(x,y) is the difference image information, S(x,y) is the sum image information, $\Phi(x,y)$ is the amount of phase on the surface of the object corresponding to image information for each pixel, d(x,y) is image information that is yielded by deconvolution of the difference image information D(x,y) using an optical transfer function of the microscope optical system, $\alpha$ is an average value of the sum image information S(x,y), $k=\lambda/4\pi$, and $\lambda$ is a wavelength.

14. A method for detecting physical amount of object, comprising:
preparing an interference optical system, the interference optical system having a light source, an illumination optical path that leads light emitted from the light source to an object to be observed, and a reference optical path that leads the light from the light source to a reference surface;
preparing an image pick-up member for picking up an interference image of the object formed by the interference optical system; and
detecting, with a computer, an amount of phase $\Phi(x,y)$ on a surface of the object corresponding to image information for each pixel using one of the following equations:

$$\Phi(x,y)=k\cdot\{h(x,y)/J_m(x,y)\}/\{[1-\{h(x,y)/J_m(x,y)\}^2/2]\}$$

$$\Phi(x,y)=k\cdot\tan^{-1}[k\cdot\{h(x,y)/J_m(x,y)\}/\{[1-\{h(x,y)/J_m(x,y)\}^2/2]\}]$$

where H(x,y) is image information that is a phase distribution of the object as picturized, h(x,y) is image information that is yielded by deconvolution of the image information H(x,y) using an optical transfer function of the interference optical system, J(x,y) is image information that is an intensity distribution as picturized, $J_m(x,y)$ is image information in which maxima of the image information J(x,y) are enveloped, $\Phi(x,y)$ is the amount of phase on the surface of the object, $k=\lambda/4\pi$, and $\lambda$ is a wavelength.

15. A method for detecting physical amount of object, comprising:
preparing a microscope optical system, the microscope optical system having a light source, an illumination optical system that leads light emitted from the light source to an object to be observed, an imaging optical system that forms an image of the object, and at least one polarizing member that separates the light from the light source into two polarized components;
preparing an adjusting member for changing an amount of retardation between the two polarized components;
preparing an image pick-up member for picking up a differential interference contrast image of the object;
picking up two differential interference contrast images of the object that have retardations equal in amount and different in sign with the image pick-up member; and
making a computer to conduct a procedure, the procedure comprising the processes of:
   performing a difference operation and a sum operation for each pair of corresponding pixels in pictures of the two differential interference contrast images, to obtain difference image information and sum image information; and
   detecting an amount of phase $\Phi(x,y)$ on a surface of the object corresponding to image information for each pixel by using one of the following equations:

$$\Phi(x,y)=k\cdot\{(1-\cos\theta)\cdot d(x,y)/\beta(x,y)\}/\{\sin\theta\cdot[1-\{d(x,y)/\beta(x,y)\}^2/2]\}$$

$$\Phi(x,y)=k\cdot\tan^{-1}[\{(1-\cos\theta)\cdot d(x,y)/\beta(x,y)\}/\{\sin\theta\cdot[1-\{d(x,y)/\beta(x,y)\}^2/2]\}]$$

where $\theta$ is the amount of retardation between the two polarized components, D(x,y) is the difference image information, $S(x,y)$ is the sum image information, $\Phi(x,y)$ is the amount of phase on the surface of the object corresponding to image information for each pixel, $d(x,y)$ is image information that is yielded by deconvolution of the difference image information $D(x,y)$ using an optical transfer function of the microscope optical system, $\beta(x,y)$ is image information in which maxima of image information $S(x,y)$ are enveloped, $k=\lambda/4\pi$, and $\lambda$ is a wavelength.

16. A method for detecting physical amount of object, comprising:

preparing a microscope optical system, the microscope optical system having a light source, an illumination optical system that leads light emitted from the light source to an object to be observed, an imaging optical system that forms an image of the object, and at least one polarizing member that separates the light from the light source into two polarized components;

preparing an adjusting member for changing an amount of retardation between the two polarized components;

preparing an image pick-up member for picking up a differential interference contrast image of the object;

picking up two differential interference contrast images of the object that have retardations equal in amount and different in sign with the image pick-up member; and making a computer to conduct a procedure, the procedure comprising the processes of:

performing a difference operation and a sum operation for each pair of corresponding pixels in pictures of the two differential interference contrast images, to obtain difference image information and sum image information; and detecting an amount of phase $\Phi(x,y)$ on a surface of the object corresponding to image information for each pixel by using one of the following equations:

$$\Phi(x,y)=k\cdot\{(1-\cos\theta)\cdot d(x,y)\}/\{\sin\theta\cdot\Gamma(x,y)\}$$

$$\Phi(x,y)=k\cdot tan^{-1}[k\cdot\{(1-\cos\theta)\cdot d(x,y)\}/\{\sin\theta\cdot\Gamma(x,y)\}]$$

where $\theta$ is the amount of retardation between the two polarized components as detected, $D(x,y)$ is the difference image information, $S(x,y)$ is the sum image information, $\Phi(x,y)$ is the amount of phase on the surface of the object corresponding to image information for each pixel, $d(x,y)$ is image information that is yielded by deconvolution of the difference image information $D(x,y)$ using an optical transfer function of the microscope optical system, $\Gamma(x,y)$ is image information that is composed of information of a low-frequency component extracted from the sum image information $S(x,y)$, $k=\lambda/4\pi$, and $\lambda$ is a wavelength.

17. A method for detecting physical amount of object, comprising:

preparing an interference optical system, the interference optical system having a light source, an illumination optical path that leads light emitted from the light source to an object to be observed, and a reference optical path that leads the light from the light source to a reference surface;

preparing an image pick-up member for picking up an interference image of the object formed by the interference optical system; and detecting, with a computer, an amount of phase $\Phi(x,y)$ on a surface of the object corresponding to image information for each pixel using one of the following equations:

$$\Phi(x,y)=k\cdot\{h(x,y)/J_c\}/\{[1-\{h(x,y)/J_c\}^2/2]\}$$

$$\Phi(x,y)=k\cdot tan^{-1}[k\cdot\{h(x,y)/J_c\}/\{[1-\{h(x,y)/J_c\}^2/2]\}]$$

where $H(x,y)$ is image information that is a phase distribution of the object as picturized by the interference optical system, $h(x,y)$ is image information that is yielded by deconvolution of the image information $H(x,y)$ using an optical transfer function of the interference optical system, $J(x,y)$ is image information that is an intensity distribution as picturized, $J_c$ is an average value of maxima of the image information $J(x,y)$, $\Phi(x,y)$ is the amount of phase on the surface of the object, $k=\lambda/4\pi$, and $\lambda$ is a wavelength.

18. A method for detecting physical amount of object, comprising:

preparing an interference optical system, the interference optical system having a light source, an illumination optical path that leads light emitted from the light source to an object to be observed, and a reference optical path that leads the light from the light source to a reference surface;

preparing an image pick-up member for picking up an interference image of the object formed by the interference optical system; and detecting, with a computer, an amount of phase $\Phi(x,y)$ on a surface of the object corresponding to image information for each pixel using one of the following equations:

$$\Phi(x,y)=k\cdot\{h(x,y)/J_a(x,y)\}/\{[1-\{h(x,y)/J_a(x,y)\}^2/2]\}$$

$$\Phi(x,y)=k\cdot tan^{-1}[k\cdot\{h(x,y)/J_a(x,y)\}/\{[1-\{h(x,y)/J_a(x,y)\}^2/2]\}]$$

where $H(x,y)$ is image information that is a phase distribution of the object as picturized by the interference optical system, $h(x,y)$ is image information that is yielded by deconvolution of the image information $H(x,y)$ using an optical transfer function of the interference optical system, $J(x,y)$ is image information that is an intensity distribution as picturized, $J_a(x,y)$ is an average value of the image information $J(x,y)$ as calculated for a predetermined region therein, $\Phi(x,y)$ is the amount of phase on the surface of the object, $k=\lambda/4\pi$, and $\lambda$ is a wavelength.

19. A method for detecting physical amount of object, comprising:

preparing an interference optical system, the interference optical system having a light source, an illumination optical path that leads light emitted from the light source to an object to be observed, and a reference optical path that leads the light from the light source to a reference surface;

preparing an image pick-up member for picking up an interference image of the object formed by the interference optical system; and detecting, with a computer, an amount of phase $\Phi(x,y)$ on a surface of the object corresponding to image information for each pixel using one of the following equations:

$$\Phi(x,y)=k\cdot\{h(x,y)/J_L(x,y)\}/\{[1-\{h(x,y)/J_L(x,y)\}^2/2]\}$$

$$\Phi(x,y)=k\cdot tan^{-1}[k\cdot\{h(x,y)/J_L(x,y)\}/\{[1-\{h(x,y)/J_L(x,y)\}^2/2]\}]$$

where $H(x,y)$ is image information that is a phase distribution of the object as picturized by the interference optical system, h(x,y) is image information that is yielded by deconvolution of the image information H(x,y) using an optical transfer function of the interference optical system, J(x,y) is image information that is an intensity distribution as picturized, $J_L(x,y)$ is image information that is composed of information of a low-frequency component extracted from the image information J(x,y), $\Phi(x,y)$ is the amount of phase on the surface of the object, k=$\lambda/4\pi$, and $\lambda$ is a wavelength.

20. A method for detecting physical amount of object, comprising:

preparing a microscope optical system, the microscope optical system having a light source, an illumination optical system that leads light emitted from the light source to an object to be observed, an imaging optical system that forms an image of the object, and at least one polarizing member that separates the light from the light source into two polarized components;

preparing an adjusting member for changing an amount of retardation between the two polarized components;

preparing an image pick-up member for picking up a differential interference contrast image of the object;

picking up two differential interference contrast images of the object that have retardations equal in amount and different in sign with the image pick-up member; and making a computer to conduct a procedure, the procedure comprising the processes of:

performing a difference operation and a sum operation for each pair of corresponding pixels in pictures of the two differential interference contrast images, to obtain difference image information and sum image information; and detecting an a phase distribution $\Phi(x,y)$ on a surface of the object by using the following equation:

$$\Phi(x,y)=\phi(x,y)/\{1-[\phi(x,y)]^2/2\}$$

where $\phi(x,y)$ is a phase distribution that is calculated from the difference image information and the sum image information and $\Phi(x,y)$ is the phase distribution on the object.

21. A method for detecting physical amount of object, comprising:

preparing a microscope optical system, the microscope optical system having a light source, an illumination optical system that leads light emitted from the light source to an object to be observed, an imaging optical system that forms an image of the object, and at least one polarizing member that separates the light from the light source into two polarized components;

preparing an adjusting member for changing an amount of retardation between the two polarized components;

a step of preparing an image pick-up member for picking up a differential interference contrast image of the object;

picking up two differential interference contrast images of the object that have retardations equal in amount and different in sign with the image pick-up member; and making a computer to conduct a procedure, the procedure comprising the processes of:

performing a difference operation and a sum operation for each pair of corresponding pixels in pictures of the two differential interference contrast images, to obtain difference image information and sum image information;

processing the difference image information with a deconvolution operation using an optical transfer function of the imaging optical system; and calculating out a phase distribution from the difference image information that has undergone the deconvolution operation and the sum image information, to detect a phase distribution $\Phi(x,y)$ on a surface of the object using the following equation:

$$\Phi(x,y)=\phi_d(x,y)/\{1-[\phi_d(x,y)]^2/2\}$$

where $\phi_d(x,y)$ is the phase distribution calculated out from the difference image information that has undergone the deconvolution operation and the sum image information and $\Phi(x,y)$ is the phase distribution on the surface of object.

22. A method for detecting physical amount of object, comprising:

preparing a microscope optical system, the microscope optical system having a light source, an illumination optical system that leads light emitted from the light source to an object to be observed, an imaging optical system that forms an image of the object, and at least one polarizing member that separates the light from the light source into two polarized components;

preparing an adjusting member for changing an amount of retardation between the two polarized components;

preparing an image pick-up member for picking up a differential interference contrast image of the object;

picking up at least three differential interference contrast images that have different amounts of retardation with the image pick-up member; and detecting, with a computer, a phase distribution $\Phi(x,y)$ on a surface of the object from the at least three differential interference contrast images by using the following equation:

$$\Phi(x,y)=\phi_f(x,y)/\{1-[\phi_f(x,y)]^2/2\}$$

where $\phi_f(x,y)$ is a phase distribution calculated out from the three differential interference contrast images and $\Phi(x,y)$ is the phase distribution on the surface of the object.

23. A method for detecting physical amount of object, comprising:

preparing a microscope optical system, the microscope optical system having a light source, an illumination optical system that leads light emitted from the light source to an object to be observed, an imaging optical system that forms an image of the object, and at least one polarizing member that separates the light from the light source into two polarized components;

preparing an adjusting member for changing an amount of retardation between the two polarized components;

preparing an image pick-up member for picking up a differential interference contrast image of the object;

picking up at least three differential interference contrast images that have different amounts of retardation with the image pick-up member; and making a computer to conduct a procedure, the procedure comprising the processes of:

calculating out a phase distribution from the at least three differential interference contrast images that have different amounts of retardation; and processing the phase distribution with a deconvolution operation using an optical transfer function of the imaging optical system, to detect a phase distribution Φ(x,y) on a surface of the object using the following equation:

$$\Phi(x,y)=\phi_{fd}(x,y)/\{1-[\phi_{fd}(x,y)]^2/2\}$$

where $\phi_{fd}(x,y)$ is the phase distribution that has undergone the deconvolution operation and Φ(x,y) is the phase distribution on the object.

24. A method for detecting physical amount of object, comprising:

preparing an interference optical system, the interference optical system having a light source, an illumination optical path that leads light emitted from the light source to an object to be observed, and a reference optical path that leads the light from the light source to a reference surface;

preparing an image pick-up member for picking up an interference image of the object formed by the interference optical system; and making a computer to conduct a procedure, the procedure comprising the processes of:

calculating out a phase distribution from the interference image picked up by the image pick-up member; and detecting a phase distribution on a surface of the object by using the following equation:

$$\Phi(x,y)=\phi_f(x,y)/\{1-[\phi_f(x,y)]^2/2\}$$

where $\phi_f(x,y)$ is the phase distribution calculated out from the photographed interface image and Φ(x,y) is a phase distribution on the surface of the object.

* * * * *